US011898402B2

(12) United States Patent
Klish et al.

(10) Patent No.: US 11,898,402 B2
(45) Date of Patent: Feb. 13, 2024

(54) ROLL-UP DOORS AND METHOD FOR SECURING SAME

(71) Applicant: CORNELLCOOKSON, LLC, Mountain Top, PA (US)

(72) Inventors: Ian Klish, Nanticoke, PA (US); Joseph Balay, Sugarloaf, PA (US)

(73) Assignee: CORNELLCOOKSON, LLC, Mountain Top, PA (US)

( * ) Notice: Subject to any disclaimer, the term of this patent is extended or adjusted under 35 U.S.C. 154(b) by 0 days.

(21) Appl. No.: 17/569,987

(22) Filed: Jan. 6, 2022

(65) Prior Publication Data

US 2022/0220803 A1 Jul. 14, 2022

Related U.S. Application Data

(63) Continuation of application No. 16/069,988, filed as application No. PCT/US2017/013501 on Jan. 13, 2017, now Pat. No. 11,248,416.

(Continued)

(51) Int. Cl.

*E06B 9/58* (2006.01)
*E06B 9/13* (2006.01)
*E06B 9/17* (2006.01)

(52) U.S. Cl.

CPC ................ *E06B 9/581* (2013.01); *E06B 9/13* (2013.01); *E06B 9/17* (2013.01); *E06B 9/582* (2013.01);

(Continued)

(58) Field of Classification Search

CPC ..... E06B 9/13; E06B 9/17; E06B 9/58; E06B 9/581; E06B 9/582; E06B 9/0692;

(Continued)

(56) References Cited

U.S. PATENT DOCUMENTS 1,882,982 A * 10/1932 Schmiedeskamp ..... E06B 9/581 160/31
3,017,927 A * 1/1962 Demko .................. E06B 9/582 160/271

(Continued)

FOREIGN PATENT DOCUMENTS

WO 2017123992 A1 7/2017

OTHER PUBLICATIONS

Examination Report for UAE Patent Application No. P6000968/2018; dated Jan. 3, 2022; 9 pages.

(Continued)

*Primary Examiner* — Abe Massad

(57) ABSTRACT

A roll-up door including a flexible curtain having a front surface, a back surface, a first end coupled to a shaft, a second end opposite the first end, and first and second side edges extending between the first end and the second end, the flexible curtain being moveable between a retracted position wherein the flexible curtain is coiled around the shaft and a deployed position wherein the flexible curtain is uncoiled from the shaft. A first retention band is mounted along at least a portion of the first side edge of the flexible curtain, the first retention band including an inner surface at least partially facing towards the flexible curtain, an outer surface opposite the inner surface, a fixed edge attached to the flexible curtain generally parallel to the first side edge, and a free edge opposite the fixed edge and movable relative to the fixed edge.

19 Claims, 20 Drawing Sheets

Related U.S. Application Data

(60) Provisional application No. 62/278,202, filed on Jan. 13, 2016.

(52) U.S. Cl.
CPC ... *E06B 2009/135* (2013.01); *E06B 2009/583* (2013.01); *E06B 2009/588* (2013.01)

(58) Field of Classification Search
CPC ......... E06B 2009/135; E06B 2009/583; E06B 2009/588; E06B 2009/585
See application file for complete search history.

(56) References Cited

U.S. PATENT DOCUMENTS

| | | | | |
|---|---|---|---|---|
| 3,116,097 | A * | 12/1963 | Novales | E06B 9/581 312/297 |
| 4,220,189 | A * | 9/1980 | Marquez | E06B 9/582 160/269 |
| 4,398,585 | A * | 8/1983 | Marlow | E06B 9/582 160/271 |
| 4,453,584 | A * | 6/1984 | Steele | E06B 9/24 428/178 |
| 4,649,981 | A * | 3/1987 | Bibeau | E06B 9/581 160/273.1 |
| 4,825,921 | A * | 5/1989 | Rigter | E06B 9/582 160/271 |
| 4,934,437 | A * | 6/1990 | Kraeutler | E06B 9/0692 160/264 |
| 5,058,651 | A * | 10/1991 | Ashley | E06B 9/581 160/271 |
| 5,163,495 | A * | 11/1992 | Lichy | E06B 9/58 160/271 |
| 5,246,053 | A * | 9/1993 | Kraeuter | E06B 9/262 160/264 |
| 5,351,742 | A * | 10/1994 | Lichy | E06B 9/11 160/310 |
| 5,964,271 | A * | 10/1999 | Lapointe | E06B 9/581 160/264 |
| 6,357,507 | B1 * | 3/2002 | Stoebich | E06B 9/56 160/44 |
| 6,776,211 | B2 * | 8/2004 | Schlecht | B60J 1/2027 160/370.22 |
| 7,114,767 | B2 | 10/2006 | Grimm et al. | |
| 7,464,743 | B1 * | 12/2008 | Berger, Jr. | E06B 9/581 160/133 |
| 7,744,151 | B2 * | 6/2010 | Jansen | B60J 7/0015 296/214 |
| 7,793,702 | B2 * | 9/2010 | Biewer | B60J 7/0015 296/214 |
| 7,950,440 | B2 * | 5/2011 | Rockelmann | B60J 1/2052 160/370.22 |
| 7,967,052 | B2 * | 6/2011 | Lin | B60J 7/0015 160/370.22 |
| 8,016,014 | B2 * | 9/2011 | Crider | E06B 7/16 160/89 |
| 8,109,317 | B2 * | 2/2012 | Bostyn | E06B 9/581 160/271 |
| 8,113,266 | B2 * | 2/2012 | Cloninger | E06B 9/13 160/310 |
| 8,371,355 | B2 * | 2/2013 | Santoro | E06B 9/581 160/269 |
| 8,419,119 | B2 * | 4/2013 | Nakamura | B60J 7/0015 160/265 |
| 8,590,593 | B2 * | 11/2013 | Kitani | B60J 7/0015 160/264 |
| 8,690,234 | B2 * | 4/2014 | Rockelmann | B60J 7/0015 296/214 |
| 8,757,241 | B2 * | 6/2014 | Stark | B60J 1/2041 160/370.22 |
| 8,955,575 | B2 * | 2/2015 | Glasl | B60J 7/0015 160/370.22 |
| 8,997,831 | B2 * | 4/2015 | Lin | B60J 7/0015 160/370.22 |
| 9,067,479 | B2 * | 6/2015 | Yukisada | B60J 7/0015 |
| 9,108,491 | B2 * | 8/2015 | Zendath | B60J 7/0015 |
| 9,127,501 | B1 * | 9/2015 | Stobich | E04B 1/942 |
| 9,205,729 | B2 * | 12/2015 | Hiramatsu | B60R 13/0231 |
| 9,358,861 | B2 * | 6/2016 | Rockelmann | B60J 1/2052 |
| 9,371,689 | B2 * | 6/2016 | Licciardi Di Stefano | E06B 9/581 |
| 9,416,589 | B2 * | 8/2016 | McTavish | E06B 9/58 |
| 9,440,100 | B2 * | 9/2016 | Lambridis | E06B 9/40 |
| 9,493,984 | B2 * | 11/2016 | Casey | E06B 9/581 |
| 9,561,708 | B2 * | 2/2017 | Yukisada | B60J 1/2052 |
| 9,637,972 | B2 * | 5/2017 | Miller | E06B 9/88 |
| 9,649,918 | B2 * | 5/2017 | Van Boxtel | B60J 7/0015 |
| 9,840,134 | B2 * | 12/2017 | Van Boxtel | B60J 7/0015 |
| 9,889,726 | B2 * | 2/2018 | Umeki | B60J 1/2041 |
| 9,956,442 | B2 * | 5/2018 | Cooper | E06B 5/00 |
| 9,994,093 | B2 * | 6/2018 | Rikkert | B60J 1/2052 |
| 10,132,117 | B2 * | 11/2018 | Munsters | E06B 9/42 |
| 10,173,503 | B2 * | 1/2019 | Ten-Jet-Foei | B60J 1/2075 |
| 10,221,561 | B2 * | 3/2019 | Siller | E04B 1/947 |
| 11,248,416 | B2 * | 2/2022 | Klish | E06B 9/13 |
| 2002/0100219 | A1 * | 8/2002 | Rissone | E06B 7/2316 49/470 |
| 2002/0124972 | A1 | 9/2002 | Simon | |
| 2006/0027347 | A1 * | 2/2006 | Boehm | B60J 7/0015 160/273.1 |
| 2006/0054284 | A1 * | 3/2006 | Coenraets | E06B 9/88 160/8 |
| 2007/0175603 | A1 * | 8/2007 | Lin | E06B 9/42 160/273.1 |
| 2007/0277943 | A1 * | 12/2007 | Boerger | E06B 9/581 160/273.1 |
| 2008/0197655 | A1 * | 8/2008 | Oerke | B60J 7/0015 296/83 |
| 2009/0165964 | A1 * | 7/2009 | Harbison | E06B 9/42 160/327 |
| 2009/0178771 | A1 * | 7/2009 | Lin | B60J 7/0015 160/370.22 |
| 2010/0032992 | A1 * | 2/2010 | Keller | B60J 7/0007 160/267.1 |
| 2011/0067307 | A1 * | 3/2011 | Dondlinger | E06B 9/56 49/350 |
| 2011/0146921 | A1 * | 6/2011 | Nellen | B60J 7/0015 160/370 |
| 2012/0012262 | A1 * | 1/2012 | Santoro | E06B 9/582 160/271 |
| 2013/0186578 | A1 | 7/2013 | Lin | |
| 2013/0255893 | A1 * | 10/2013 | Stobich | B32B 5/024 160/268.1 |
| 2013/0306252 | A1 * | 11/2013 | Lambridis | E06B 9/582 160/133 |
| 2014/0020853 | A1 | 1/2014 | Balay et al. | |
| 2014/0190097 | A1 | 7/2014 | Drifka et al. | |
| 2015/0368962 | A1 * | 12/2015 | Motosko | E04H 9/14 160/107 |
| 2016/0257184 | A1 | 9/2016 | Van Boxtel | |
| 2016/0348424 | A1 * | 12/2016 | Lorenzani | E06B 9/13 |
| 2016/0368353 | A1 * | 12/2016 | Clephas | B60J 7/0015 |
| 2017/0008383 | A1 * | 1/2017 | Ten-Jet-Foei | B60J 7/0015 |
| 2020/0149346 | A1 * | 5/2020 | Solomaniuck | E06B 9/58 |
| 2020/0173231 | A1 * | 6/2020 | Drifka | E06B 9/13 |

OTHER PUBLICATIONS

Examination Report for Saudi Arabian Patent Application No. 518392008 dated Feb. 24, 2022; 6 pages.
International Search Report and Written Opinion dated Apr. 4, 2017 of International Patent Application No. PCT/US2017/013501.
Saudi Arabian Examination Report dated Mar. 31, 2021 for Saudi Arabian Patent Application No. 518392008, 6 pages.

* cited by examiner

ROLL-UP DOORS AND METHOD FOR SECURING SAME

CROSS REFERENCE TO RELATED APPLICATIONS

The present application is a continuation of U.S. patent application Ser. No. 16/069,988 filed Jul. 13, 2018, which is a U.S. National Phase Application under 35 U.S.C. 371 of International Application No. PCT/US2017/013501 filed Jan. 13, 2017, which claims the benefit of U.S. Provisional Patent Application No. 62/278,202 filed Jan. 13, 2016 entitled "Roll-Up Doors and Method for Securing Same", the disclosure of each of which is hereby incorporated by reference in their entireties.

FIELD OF THE INVENTION

The present invention, according to some embodiments, relates to roll-up doors. More particularly, in some embodiments the present invention relates to roll-up doors having one or more retention bands configured to secure the roll-up door to a guide. In further embodiments, the present invention relates to methods for securing a roll-up door to a guide.

BACKGROUND OF THE INVENTION

Roll-up doors are often used to form a closure over an opening in a building, such as garages, warehouses, stores, etc. Such roll-up doors generally include a flexible curtain which can be coiled and uncoiled from a shaft that is mounted at one end of the opening in order to open and close the opening. To close the opening, for example, the flexible curtain may be uncoiled from the shaft such that an end of the flexible curtain is extended away from the shaft toward an opposite end of the opening. Retracting the end of the flexible curtain toward the shaft by coiling the flexible curtain around the shaft uncovers the opening to allow access through the opening. For vertical doors, for example, the shaft may be mounted above the opening and the end of the flexible curtain may be lowered toward the floor to close the opening or raised to uncover the opening.

The side edges of the flexible curtains have been threaded into guides mounted along the lateral sides of the opening. Such guides are generally adapted to direct the flexible curtain as the flexible curtain is coiled and uncoiled and to help seal the sides of the opening. A difficulty that may be encountered with typical roll-up doors is that the side edges of the flexible curtain can be pulled out of the guides during operation or, for example, when a force is applied against the flexible curtain in the closed position. When this occurs, the roll-up door is unable to provide proper closure of the opening.

SUMMARY OF THE INVENTION

The present invention, according to some embodiments, provides a means and method for securing a flexible curtain of a roll-up door to a guide in order to prevent an edge of the flexible curtain from being pulled out of the guide. In some embodiments the present invention relates to roll-up doors having one or more retention bands configured to secure the roll-up door to the guide.

A roll-up door according to some embodiments of the present invention includes a flexible curtain including a front surface, a back surface, a first end coupled to a shaft, a second end opposite the first end, and first and second side edges extending between the first end and the second end, the flexible curtain being moveable between a retracted position wherein the flexible curtain is coiled around the shaft and a deployed position wherein the flexible curtain is uncoiled from the shaft. In some embodiments, a first retention band is mounted along at least a portion of the first side edge of the flexible curtain, the first retention band including an inner surface at least partially facing towards the flexible curtain, an outer surface opposite the inner surface, a fixed edge attached to the flexible curtain generally parallel to the first side edge, and a free edge opposite the fixed edge and movable relative to the fixed edge.

In some embodiments, the free edge of the first retention band is capable of deflecting toward or away from the flexible curtain. In some embodiments, the inner surface of the first retention band includes a convexly curved contour extending between the fixed edge and the free edge when the flexible curtain is in the deployed position. In further embodiments, the outer surface of the first retention band includes a concavely curved contour extending between the fixed edge and the free edge when the flexible curtain is in the deployed position.

In certain embodiments, at least a portion of the first retention band is configured to transition from a curved configuration to a flattened configuration when the flexible curtain moves from the deployed position to the retracted position, and at least a portion of the first retention band is configured to transition from the flattened configuration to the curved configuration when the flexible curtain moves from the retracted position to the deployed position. In some embodiments, in the flattened configuration, at least a portion of the inner surface of the first retention band is positioned against the flexible curtain.

In some embodiments, the flexible curtain includes a first reinforcement band at the first side edge, and the fixed edge of the first retention band is attached to the first reinforcement band. In some embodiments, the first reinforcement band is a metal band. In some embodiments, the fixed edge of the first retention band is substantially aligned with the first side edge of the flexible curtain. In some embodiments, the first retention band includes a single continuous component. In one embodiment, such a single continuous component reduces or eliminates edges that would result in snags as the roll-up door is operated. The single continuous component embodiment may also enhance the sealing properties of the roll-up door. In other embodiments, the first retention band includes a plurality of segments spaced along a length of the first side edge. In some embodiments, the first retention band includes a tapered end proximate the second end of the flexible curtain.

In certain embodiments, the first retention band is made of an elastic material, for example, steel (e.g., spring steel), aluminum, or other elastic metal or metal alloy. In other embodiments, the first retention band may be made from plastics or rubbers. In one embodiment, the first retention band is constructed from material that is elastic enough to retain a curved shape after being held in the flatted position for an extended period duration while still being thin enough to coil and strong enough to provide retention. In some embodiments, the roll-up door may be configured to contain fire and/or smoke. According to some such embodiments, the roll-up door is configured to withstand temperatures of 400° F. or greater, preferably 1800° F. or greater. Thus, in some embodiments, components of the roll-up door are made from materials configured to be retain strength at these temperatures, and may be made from fire-resistant or flame retardant materials.

A roll-up door according to some embodiments of the present invention further includes a second retention band mounted along the second side edge of the flexible curtain. In some embodiments, the second retention band may have any of the characteristics and properties described above and herein with respect to the first retention band. In some embodiments, for example, the second retention band includes an inner surface at least partially facing towards the flexible curtain, an outer surface opposite the inner surface, a fixed edge attached to the flexible curtain generally parallel to the second side edge, and a free edge opposite the fixed edge and movable relative to the fixed edge. In some embodiments, the second retention band may be symmetrically arranged with the first retention band.

Further embodiments of the present invention relate to a roll-up door assembly. In some embodiments, the roll-up door assembly includes a roll-up door as described above and herein in combination with a first guide. The first guide, according to some embodiments, defines a track configured and dimensioned to receive at least a portion of the first side edge of the flexible curtain. In some embodiments, the first retention band is configured to be received in the track defined by the first guide. In some embodiments, the first retention band is configured to anchor the first side edge of the flexible curtain within the track defined by the first guide. In some embodiments, the first guide includes a throat through which the first side edge of the flexible curtain is configured to be inserted, and the throat has an opening width that is less than a distance between the free edge of the first retention band and the flexible curtain when the flexible curtain is in the deployed position. In some embodiments, the first retention band is configured to deflect towards the flexible curtain in response to the first side edge of the flexible curtain being inserted into the throat. In some embodiments, a portion of the first guide is configured to be received between the inner surface of the first retention band and the flexible curtain. In one embodiment, the first guide includes a first element and a second element configured to engage the first element. In one embodiment, the throat is positioned between the first element and the second element.

In certain embodiments, the roll-up door assembly includes a second guide defining a track receiving at least a portion of the second side edge of the flexible curtain. According to some of these embodiments, the roll-up door includes a second retention band mounted along the second side edge of the flexible curtain, the second retention band including an inner surface at least partially facing towards the flexible curtain, an outer surface opposite the inner surface, a fixed edge attached to the flexible curtain generally parallel to the second side edge, and a free edge opposite the fixed edge and movable relative to the fixed edge. The second retention band, in some embodiments, is received in the track defined by the second guide and configured to anchor the second side edge of the flexible curtain within the track defined by the second guide. The second guide may have any of the characteristics described above and herein with respect to the first guide. Moreover, in some embodiments, the second guide may be symmetrically arranged with the first guide. In some embodiments, at least a portion of the inner surface of the first retention band may be adjacent the flexible curtain. In one embodiment, at least a portion of the outer surface of the first retention band may be adjacent the flexible curtain.

In yet a further embodiment, the present invention provides a method of securing a roll-up door to a guide. In some embodiments, the method includes providing a roll-up door comprising flexible curtain having a side edge and a retention band mounted along at least a portion of the side edge of the flexible curtain, the retention band including a fixed edge attached to the flexible curtain generally parallel to the side edge, and a free edge opposite the fixed edge and movable relative to the fixed edge, the retention band being capable of moving (e.g., bending) toward or away from the flexible curtain, providing a guide comprising a throat and a track configured to receive at least a portion of the side edge of the flexible curtain and the retention band, the throat having an opening width smaller than a width of the track, urging (e.g., bending) the retention band towards the flexible curtain by passing the side edge and the retention band through the throat and into the track of the guide, and allowing the retention band to move (e.g., bend) away from flexible curtain when the retention band and the side edge are received in the track of the guide. In some embodiments of the method, allowing the retention band to move (e.g., bend) away from flexible curtain increases a distance between the free edge of the retention band and the flexible curtain to above the opening width of the throat.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein. For example, although not expressly stated herein, features of one or more various disclosed embodiments may incorporated into other of the disclosed embodiments. The appended drawings may not be drawn to scale.

DETAILED DESCRIPTION

Figure 1:
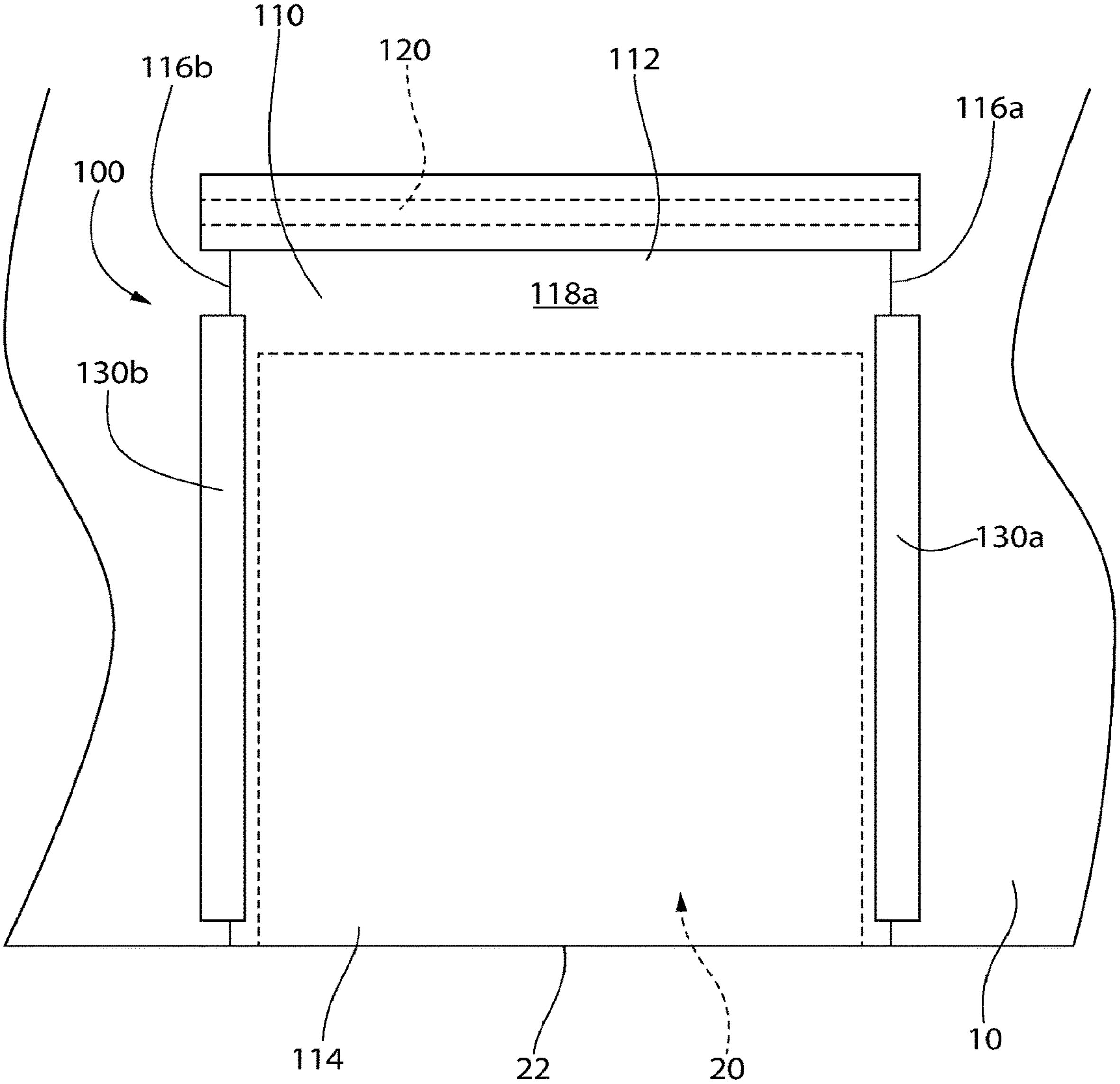
FIG. 1 is a generalized diagram showing a roll-up door assembly in a deployed position according to an embodiment of the present invention.

The present subject matter will now be described more fully hereinafter with reference to the accompanying Figures, in which representative embodiments are shown. The present subject matter can, however, be embodied in different forms and should not be construed as limited to the embodiments set forth herein. Rather, these embodiments are provided to describe and enable one of skill in the art. All publications, patent applications, patents, and other references mentioned herein are incorporated by reference in their entirety.

Referring to the drawings in detail, wherein like reference numerals indicate like elements throughout, there is shown in FIGS. 1-20 roll-up doors in accordance with exemplary embodiments of the present invention.

FIG. 1 shows generally a roll-up door assembly 100 in a deployed condition in accordance with certain embodiments of the present invention which, for example, may be used to cover an opening 20 in a wall 10 of a building or structure. Opening 20 may be, for example, a doorway to a garage, warehouse, store, etc., according to some embodiments. In some embodiments, opening 20 may be an opening for an elevator, for example, roll-up door assembly 100 may be used to cover an elevator door. In other embodiments, opening 20 may be a window. Roll-up door assembly 100 in some embodiments includes a flexible curtain 110 that is sized and shaped to cover opening 20 when in a deployed state. Preferably the area of flexible curtain 110 is larger than the area of opening 20. While opening 20 is generally illustrated as a vertical opening, it should be appreciated that roll-up door assembly 100 may also be adapted to cover any openings, e.g., horizontal openings on the floor or ceiling of a building or structure.

Flexible curtain 110 may be made of any suitable flexible sheet material known in the art, for example, metal (e.g., steel, aluminum, corrugated metal), plastic sheets, rubber etc., and is configured to be wound and unwound from a shaft 120. Flexible curtain 110 may have any suitable thickness to allow it to coil smoothly around shaft 120. In some embodiments, for example, flexible curtain 110 has a thickness ranging from about 0.001 inches to about 0.1 inches. In some embodiments, flexible curtain 110 has a thickness ranging from about 0.002 inches to about 0.05 inches. Other thicknesses for flexible curtain 110 may also be used depending on the particular material selected. Shaft 120, according to the some embodiments, is configured to be positioned at or proximate one end of opening 20, and may take the form of an axle, rod, drum, etc. Shaft 120 may have any suitable diameter. In some embodiments, shaft 120 may have a diameter, for example, ranging from about 2 inches to about 6 inches, about 3 inches to about 5 inches, about 3.5 inches to about 4.5 inches. In some embodiments, shaft 120 has a diameter of at least 2 inches, at least 3 inches, at least 4 inches, at least 5 inches, or at least 6 inches. In some embodiments, a larger diameter shaft may help flexible curtain 110 to coil more smoothly. Where opening 20 is a vertical opening (e.g., a vertical doorway), as illustrated in FIG. 1, shaft 120 may be configured to be mounted horizontally above opening 20 on wall 10. Shaft 120, in certain embodiments, has a length that is equal to or greater than the width of opening 20. Shaft 120 may further be connected to a system configured to rotate shaft 120 in order to wind/unwind flexible curtain 110, such as a motor or pulley system (not shown). In one embodiment, shaft 120 is coupled to a sensor and the shaft is configured to rotate in response to a signal from the sensor. For example, the sensor (e.g., smoke detector, gas detector) may, in response to a sensing event (e.g., detecting smoke or gas), send a signal to an actuator (e.g., motor, pulley system) to rotate shaft 120 to wind/unwind flexible curtain 110. Flexible curtain 110 generally includes a first end 112 coupled to shaft 120 (e.g., via adhesive, welding, press fit), a second end 114 opposite first end 112, and first and second side edges 116*a*, 116*b* which extend between first end 112 and second end 114. Moreover, flexible curtain 110 includes a front surface 118*a*, which for example may face towards the interior of the building or structure, and a back surface 118*b* opposite front surface 118*a*, which for example may face toward opening 20.

In some embodiments, roll-up door assembly 100 further includes first and second guides 130*a*, 130*b* which are configured to receive side edges 116*a*, 116*b* of flexible curtain 110, respectively. Guides 130*a*, 130*b* in some embodiments may be configured to be mounted on wall 10 along the lateral sides of opening 20 and may define tracks through which side edges 116*a*, 116*b* of flexible curtain 110 may slide during operation. In some embodiments, guides 130*a*, 130*b* may be mounted outside a frame that defines opening 20 (e.g., around a door frame). In some embodiments, guides 130*a*, 130*b* are mounted directly adjacent to and may abut a frame that defines opening 20. In other embodiments, guides 130*a*, 130*b* may be mounted on or within a frame that defines opening 20 (e.g., on the sides of a door frame). In one embodiment, where opening 20 is a vertical opening, guides 130*a*, 130*b* are configured to be oriented vertically. In other embodiments, where opening 20 is a horizontal opening, guides 130*a*, 130*b* are configured to be oriented horizontally. In some embodiments, guides 130*a*, 130*b* are configured to be mounted parallel to each other on either side of opening 20 and spaced apart by a predetermined distance that is sufficient to cover opening 20. In further embodiments, each of guides 130*a* and 130*b* are configured to be mounted perpendicular to shaft 120. In some embodiments, guides 130*a*, 130*b* are adapted to direct flexible curtain 110 as flexible curtain 110 is coiled and uncoiled and to help seal the sides of opening 20. Guides 130*a*, 130*b* may be constructed from metal or other suitable materials known in the art. In some embodiments, guide 130 includes a fascia attachment element (e.g., anchor, screw, weld, adhesive).

FIG. 1 particularly shows flexible curtain 110 in a deployed position wherein flexible curtain 110 has been uncoiled from shaft 120 sufficiently to cover opening 20. In the illustrated embodiment, second end 114 of flexible curtain 110 has been extended away from shaft 120 sufficiently to reach end 22 of opening 20. For example, in some embodiments, end 22 may be at the floor of the building or structure where opening 20 is a vertical doorway. In other embodiments, where opening 20 is a window, end 22 may be a window sill.

Figure 2:
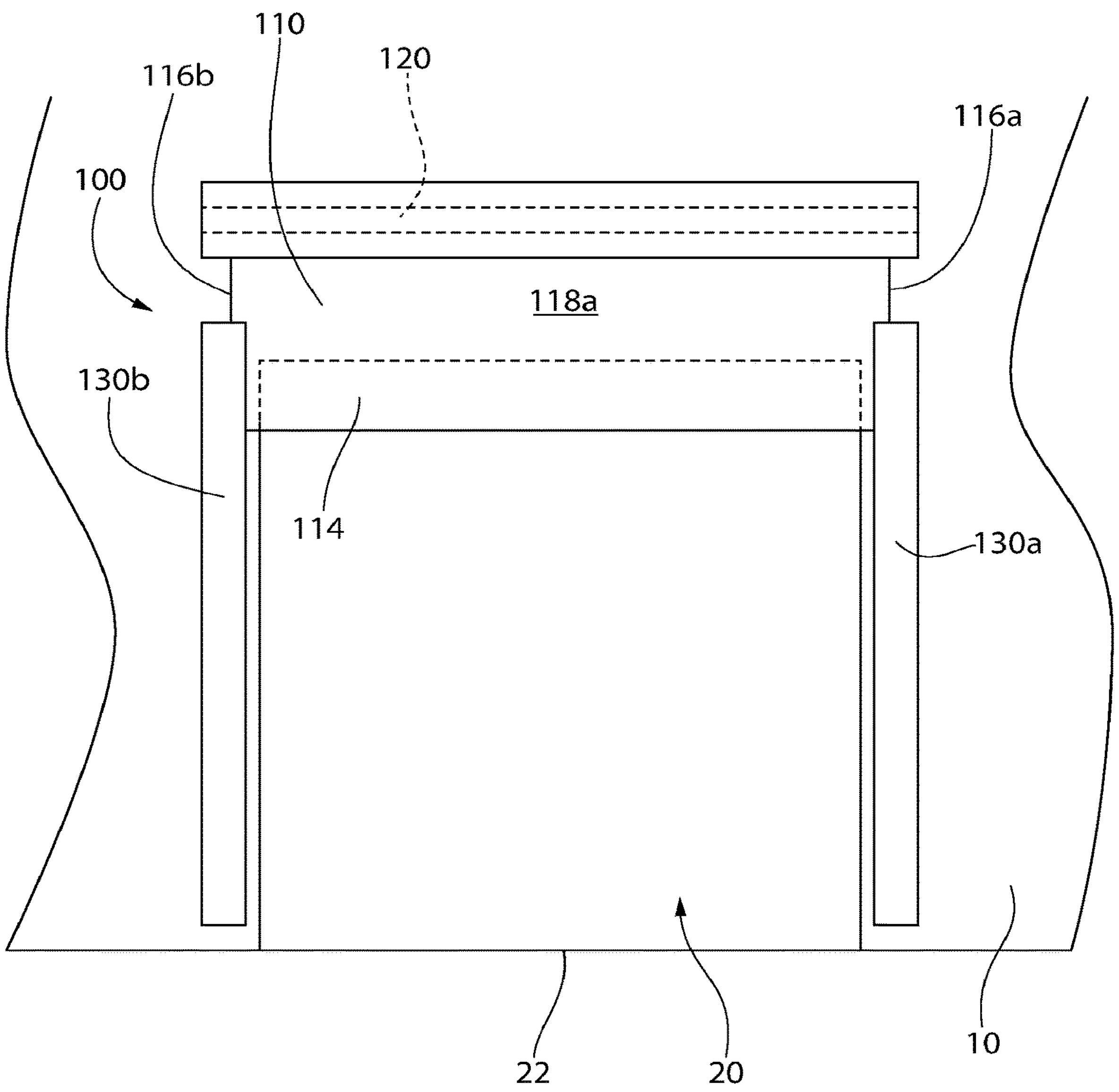
FIG. 2 is a generalized diagram showing the roll-up door assembly of FIG. 1 shown in a partially retracted position.

FIG. 2 shows flexible curtain 110 in an at least partially retracted position according to one embodiment. In this embodiment, flexible curtain 110 has been partially coiled around shaft 120 such that second end 114 of flexible curtain 110 is retracted away from end 22 of opening 20 toward shaft 120 sufficiently to allow access through opening 20. Coiling of flexible curtain 110 can be achieved by rotating shaft 120 in a first direction, which can be accomplished automatically or manually according to some embodiments. For example, as noted above, shaft 120 may be connected to a motor or pulley system (not shown) configured to rotate shaft 120. Rotating shaft 120 in a direction opposite the first direction will uncoil flexible curtain 110 and will transition flexible curtain 110 from the retracted position to the deployed position shown in FIG. 1. As flexible curtain 110 moves between the retracted position and the deployed position and vice versa, side edges 116*a*, 116*b* of flexible curtain slide 110 slide through guides 130*a*, 130*b* (e.g., sliding partly or entirely through), which help guide the movement of flexible curtain 110.

As noted above, a problem that may be encountered with typical roll-up doors occurs when the flexible curtain gets pulled out of the guides positioned on the lateral sides of the opening. This problem prevents the opening from being properly covered by the flexible curtain. The roll-up door according to preferred embodiments of the present invention includes one or more retention members (e.g., retention bands) configured to secure flexible curtain 110 to guides 130*a*, 130*b* which can be mounted along (e.g., coupled to, integral with or attached directly to) at least a portion of the side edges 116*a*, 116*b* of flexible curtain 110. In some embodiments, the one or more retention members (e.g., retention bands) cooperate with guides 130*a*, 130*b* to create a seal that is configured to prevent or retard smoke and/or fire from passing through opening 20 when flexible curtain 110 is in the deployed state.

Figure 3:
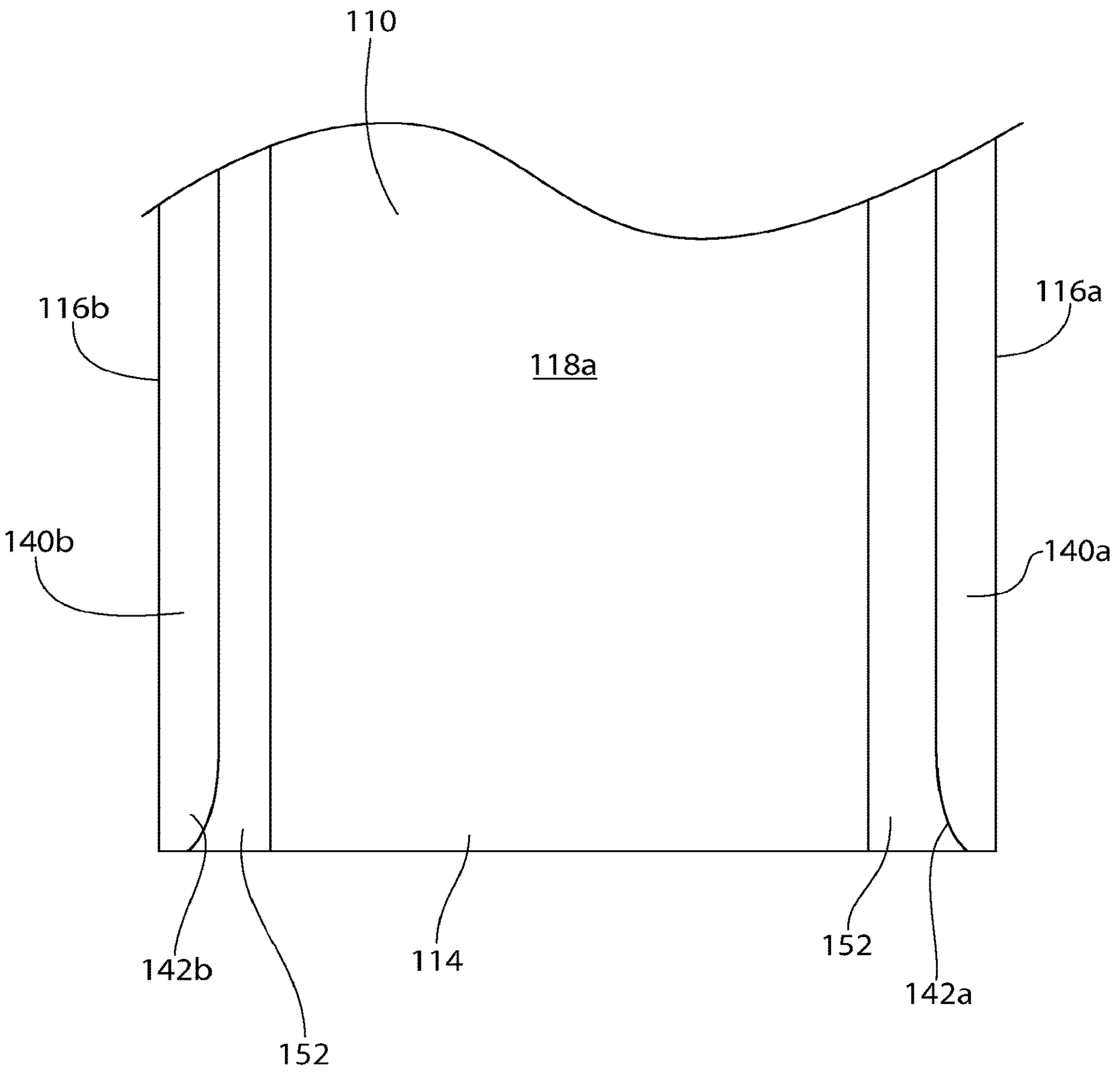
FIG. 3 is a partial elevational view of a roll-up door according to an embodiment of the present invention.
Figure 4:
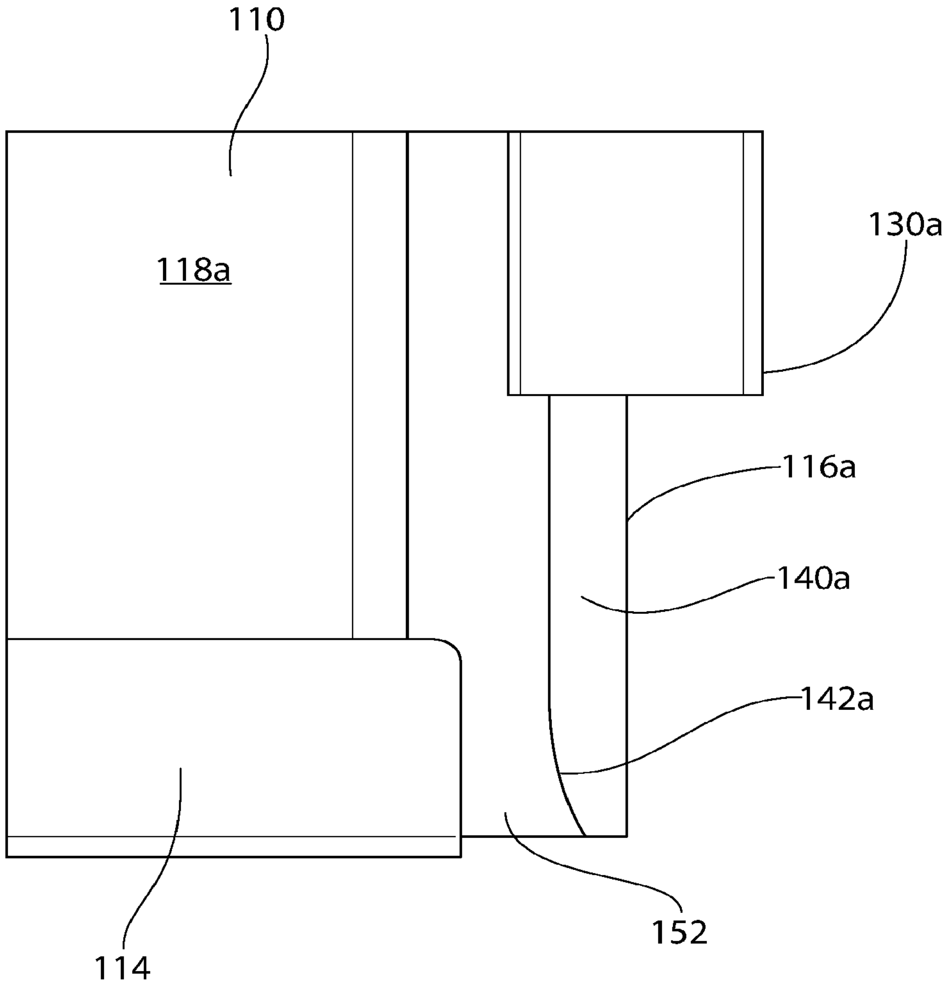
FIG. 4 is a partial elevational view showing a detail of a roll-up door assembly according to an embodiment of the present invention.

With reference now to FIGS. 3 and 4, which shows a portion of flexible curtain 110 according to some embodiments, a roll-up door of the present invention may include at least a first retention band 140*a* mounted along at least a portion of first side edge 116*a* of flexible curtain 110 on front surface 118*a*. First retention band 140*a* is configured to resist or prevent pull-out of first side edge 116*a* from first guide 130*a* during use. In certain preferred embodiments, a second retention band 140*b* can be also mounted along at least a portion of second side edge 116*b* of flexible curtain 110 on front surface 118*a*. Second retention band 140*b* is configured to resist or prevent pull-out of second side edge 116*b* from second guide 130*b* during use and may be similarly configured as and be arranged symmetrically with first retention band 140*a*. In alternative embodiments, described further below, first and second retention bands 140*a*, 140*b* may be mounted on back surface 118*b* of flexible curtain 110. In some embodiments, first and second retention bands 140*a*, 140*b* include tapered ends 142*a*, 142*b* proximate second end 114 of flexible curtain 110. In one embodiment, one benefit of tapered ends 142*a*, 142*b* includes facilitating smooth operation of roll-up door assembly 100, for example, by avoiding sharp corners that may protrude from flexible curtain 110. Such sharp corners may be susceptible to hang-ups or gouging of guides 130*a*, 130*b* during operation, or even result in injury during installation. In further embodiments, flexible curtain 110 includes reinforcement bands 152 that extend along first and second side edges 116*a*, 116*b* to which first and second retention bands 140*a*, 140*b* may be attached.

Figure 5:
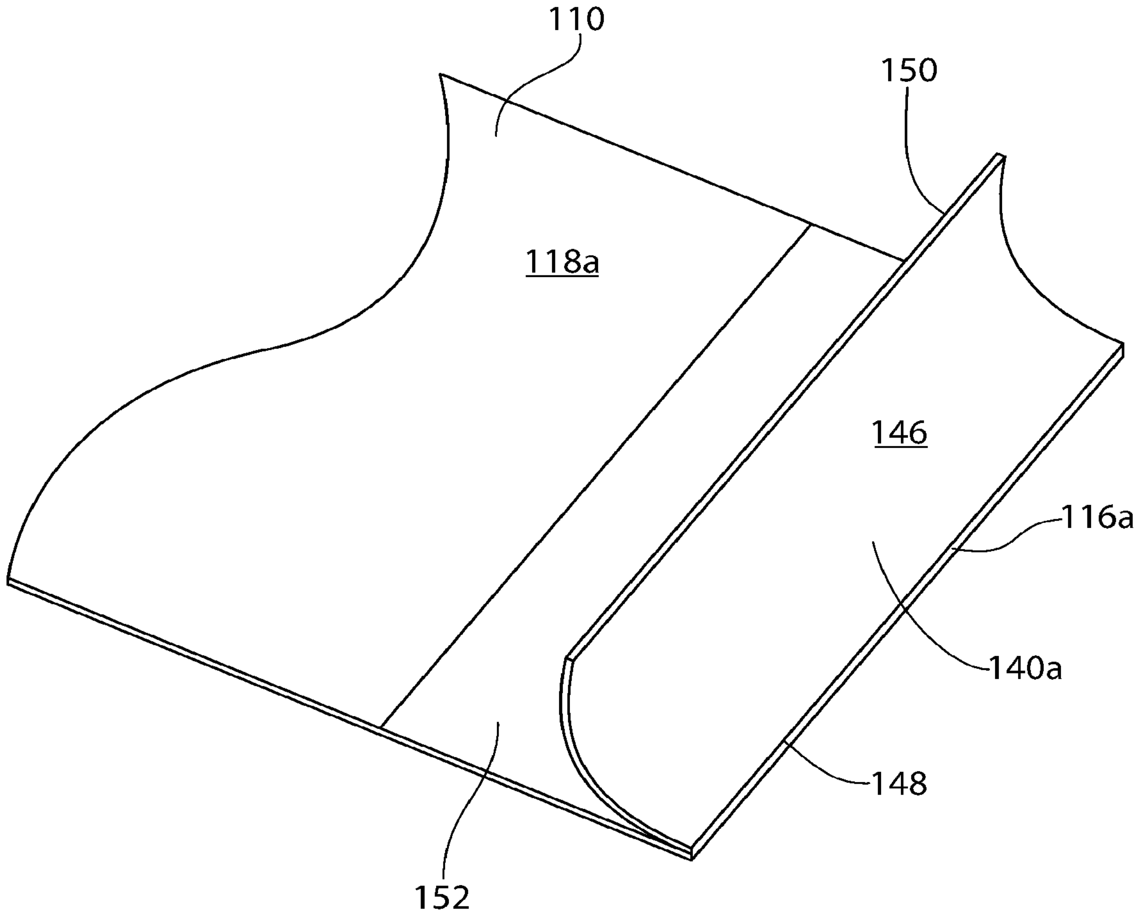
FIG. 5 is a first partial perspective view showing a portion of a flexible curtain having a retention band in accordance with an embodiment of the present invention.
Figure 6:
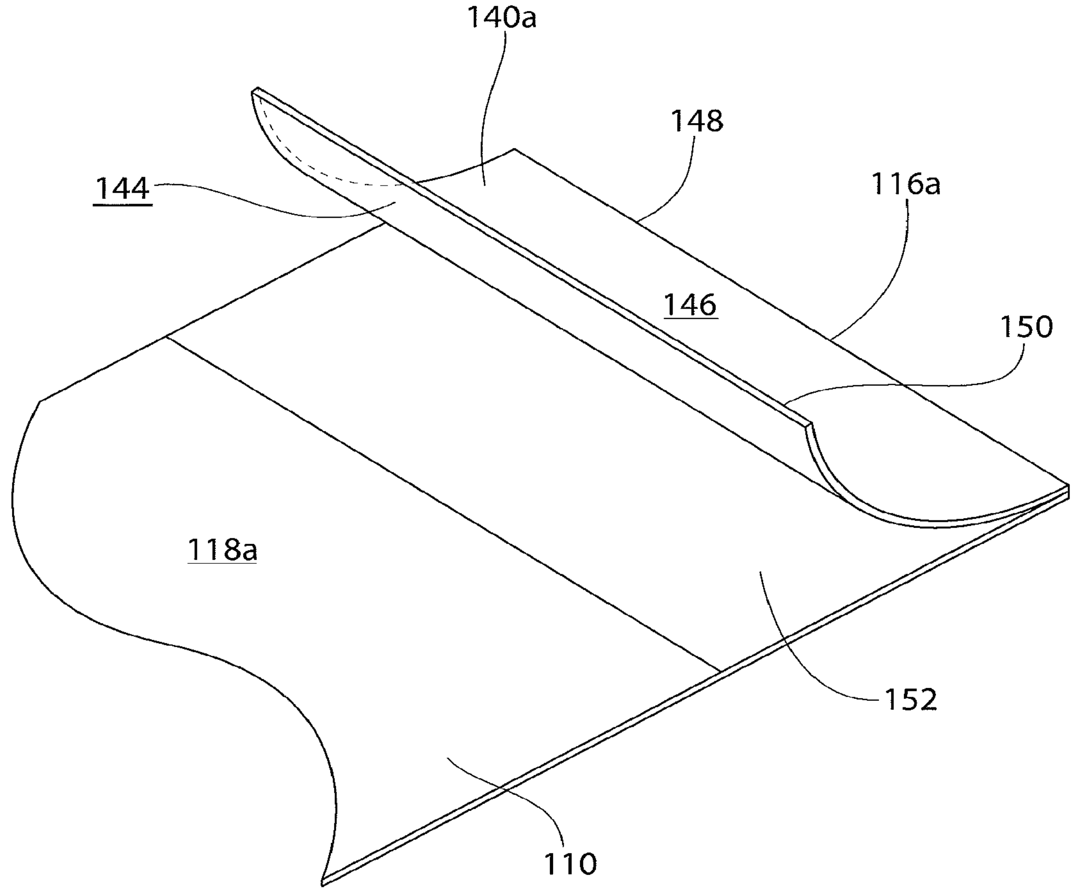
FIG. 6 is a second partial perspective view of the portion of the flexible curtain and retention band shown in FIG. 5.

FIGS. 5 and 6 provide partial perspective views showing a portion of first retention band 140*a* positioned along first side edge 116*a*. It should be understood that second retention band 140*b* may be similarly configured with respect to second side edge 116*b*. In some embodiments, first and second retention bands 140*a*, 140*b* include a strip of elastic material (e.g. spring steel, aluminum, plastic, rubber or other suitable elastic material) that is capable of deflecting toward or away from flexible curtain 110. In some embodiments, first and second retention bands 140*a*, 140*b* include material that is thin enough to enable tight, smooth coiling, elastic enough to retain the necessary curved shape when deployed (even after being held in the flattened position for extended periods), and strong enough to resist pullout from guides 130*a*, 130*b* when force is applied. In some embodiments, as noted previously, roll-up door assembly 100 may be configured to contain fire and/or smoke. According to some such embodiments, first and second retention bands 140*a*, 140*b* are configured to withstand temperatures of 400° F. or greater, preferably 1800° F. or greater. Therefore, in some embodiments, first and second retention bands 140*a*, 140*b* are made from materials configured to be retain their strength at these temperatures, and may be made from fire-resistant or flame retardant materials. In some embodiments, where first and second retention bands 140*a*, and 140*b* have elevated temperature requirements, steel may be used for retention bands 140*a*, 140*b*. In other embodiments, plastics or rubber may be used for retention bands 140*a*, 140*b* where there are no elevated temperature requirements.

As shown in FIGS. 5 and 6, in some embodiments first retention band 140*a* includes an inner surface 144 at least partially facing towards flexible curtain 110 (e.g., at least partially facing towards front surface 118*a*) and an outer surface 146 opposite inner surface 144. In further embodiments, first retention band 140*a* further includes a fixed edge 148 attached to flexible curtain 110 and a free edge 150 that is opposite fixed edge 148 and movable relative to fixed edge 148. In some embodiments, fixed edge 148 may be generally parallel to first side edge 116*a*. In some embodiments, fixed edge 148 may be aligned with first side edge 116*a*. In other embodiments, fixed edge 148 may be spaced a certain distance from first side edge 116*a*.

In certain embodiments, fixed edge 148 may be attached to flexible curtain 110 by any suitable means known in the art. In some embodiments, mechanical fasteners (e.g., screws, bolts, rivets, staples, etc.) may be used to attach fixed edge 148 to flexible curtain 110. In other embodiments, an adhesive is used to attach fixed edge 148 to flexible curtain 110. In yet other embodiments, fixed edge 148 may be welded, soldered, or brazed onto front surface 118, for example, at first side edge 116*a*. In some embodiments, as noted above, flexible curtain 110 may include reinforcement band 152 along first side edge 116*a* to which fixed edge 148 is attached (e.g., riveted, welded, etc.). In some embodiments, reinforcement band 152 is configured to provide reinforcement to flexible curtain 110 along first side edge 116*a*. In some embodiments, reinforcement band 152 provides a stronger material to which fixed edge 148 of first retention band 140*a* may be attached. A further reinforcement band may also be provided along second side edge 116*b* for the attachment of second retention band 140*b* in a similar manner. In some embodiments, reinforcement band 152 may be made from material that would provide added strength to the side edges 116*a*, 116*b* of flexible curtain 110 while still being flexible enough to also coil around shaft 120. In some embodiments, reinforcement band 152 is a metal band (e.g., steel, aluminum, etc). In some embodiments, reinforcement band 152 is a metal band that is configured to be welded to first retention band 140*a*. In other embodiments, other materials such as rubber, plastic, strong fabric, scrim or mesh may be used for reinforcement band 152. In yet other embodiments, first retention band 140*a* may be integrally formed with reinforcement band 152. Reinforcement band 152 may have any suitable thickness which allows it to coil tightly and smoothly on shaft 120. For example, in some embodiments, reinforcement band 152 may be made of steel and have a thickness in the range of about 0.003 inches to about 0.01 inches. Other thicknesses may be selected depending on the material used for reinforcement band 152.

As shown in the illustrated embodiments of FIGS. 5 and 6, first retention band 140*a* may includes a substantially curved contour extending between fixed edge 148 and free edge 150, for example, when flexible curtain 110 is in a deployed position. In some embodiments, outer surface 146 may have a concavely curved contour extending between fixed edge 148 and free edge 150, while inner surface 144 may have a convexly curved contour extending between fixed edge 148 and free edge 150. In one embodiment, at least a portion of the inner surface 144 of the retention band 140 is positioned against (e.g., pressed against) the flexible curtain 110. In one embodiment, substantially all of the inner surface 144 of the retention band 140 is pressed against the flexible curtain 110.

In some embodiments, first retention band 140*a* is configured to transition from an extended or curved configuration as exemplified in FIGS. 5 and 6 toward a flattened configuration when a sufficient force is applied against first retention band 140*a*, for example, when a sufficient force is applied against outer surface 146. In some embodiments, in order to ensure that first retention band 140*a* is able to coil tightly and smoothly, the force required to flatten first retention band 140*a* should be less than the force applied to first retention band 140*a* when it is coiled onto shaft 120. Otherwise, first retention band may retain its curved shape when flexible curtain 110 is rolled onto shaft 120 which could prevent smooth coiling. In some embodiments, the force required to flatten first retention band 140*a* will vary based on the materials used and geometry of first retention band 140*a*. In one embodiment, first retention band 140*a* has an elasticity (e.g., a Young's Modulus) selected to be low enough to ensure that retention band 140*a* will substantially flatten when flexible curtain 110 is coiled about shaft 120 such that flexible curtain 110 rolls substantially flat. Yet, the elasticity is high enough so that first retention band 140*a* springs open as the curtain is uncoiled from the shaft. In one embodiment, the elasticity is a function of the hanging weight of flexible curtain 110 (e.g., on vertical units) or the resistance of pulling flexible curtain 110 along the guides (e.g., on horizontal units). In one embodiment, the first retention band 140*a* has a Young's Modulus of about 0.01-200 GPa, 1-10 GPa, 10-50 GPa, 50-100 GPa, or 100-200 GPa. In one embodiment, the first retention band 140*a* has a Young's Modulus of at least 0.01 GPa, 0.1 GPa, 1 GPa, 5 GPa, 10 GPa, 15 GPa, 20 GPa, 25 GPa, 30 GPa, 35 GPa, 40 GPa, 45 GPa, 45 GPa, 55 GPa, 60 GPa, 65 GPa, 70 GPa, 75 GPa, 80 GPa, 85 GPa, 90 GPa, 95 GPa, 100 GPa, 110 GPa, 120 GPa, 130 GPa, 140 GPa, 150 GPa, 175 GPa, or 200 GPa.

Figure 7A:
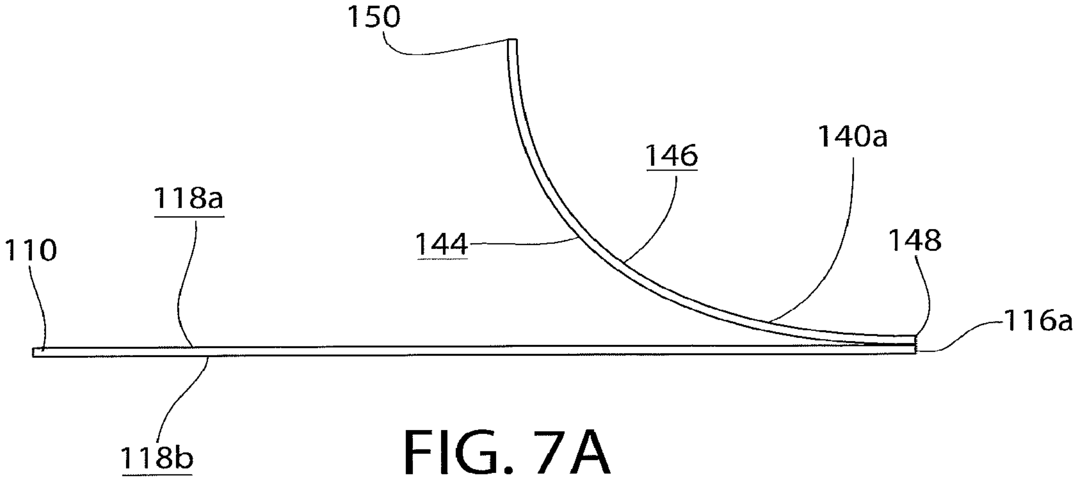
FIGS. 7A-7C are cross-sectional views showing the changes in profile of the retention band of FIG. 5 being flattened.
Figure 7B:
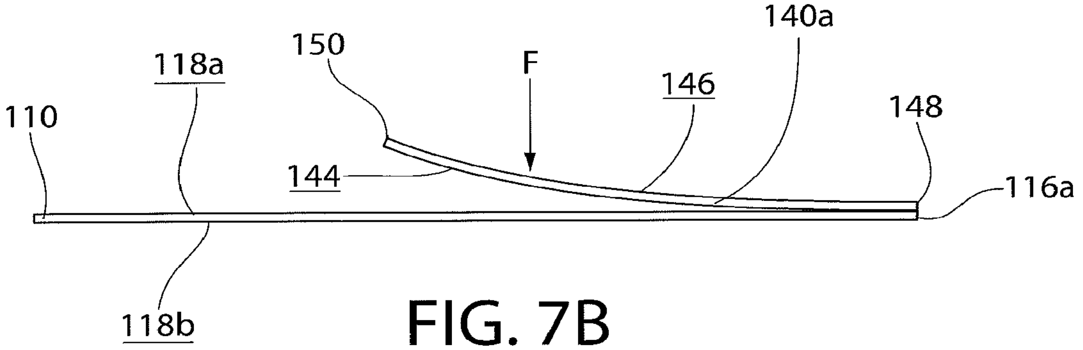
Figure 7C:
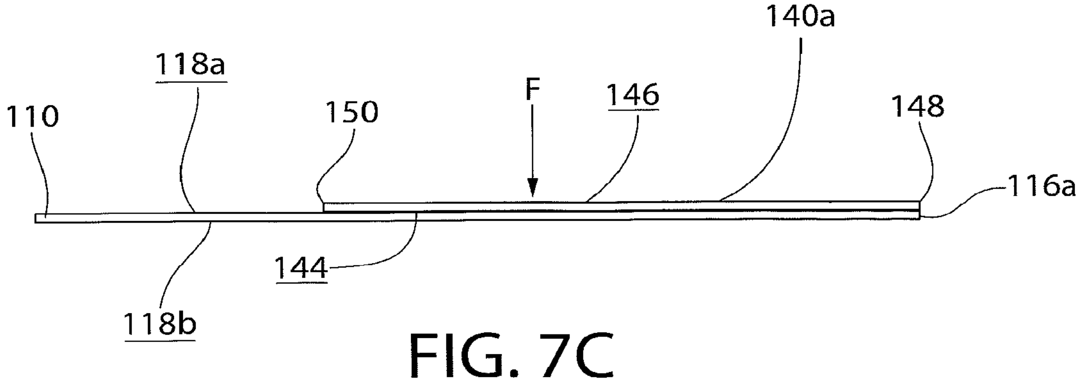

FIGS. 7A-7C are cross-sectional views showing the profile of first retention band 140*a* according to some embodiments as first retention band 140*a* transitions from an expanded (e.g., curved) configuration (FIG. 7A) to a flattened configuration (FIG. 7C) in response to a force F depicted by the arrow in FIGS. 7*b* and 7C. As illustrated, first retention band 140*a* is configured to deflect towards flexible curtain 110 in response to force F. In particular, fixed end 150 is configured to move towards until inner surface 144 of first retention band 140*a* abuts against front surface 118*a* of flexible curtain 110. Upon removal of force F, first retention band is preferably configured to spring back to the original expanded (e.g., curved) configuration (FIG. 7A) due to its elastic nature. By being configured to substantially flatten, first retention band 140*a* according to these embodiments is configured to be coiled with flexible curtain 110 around shaft 120 during operation of the roll-up door.

Figure 8:
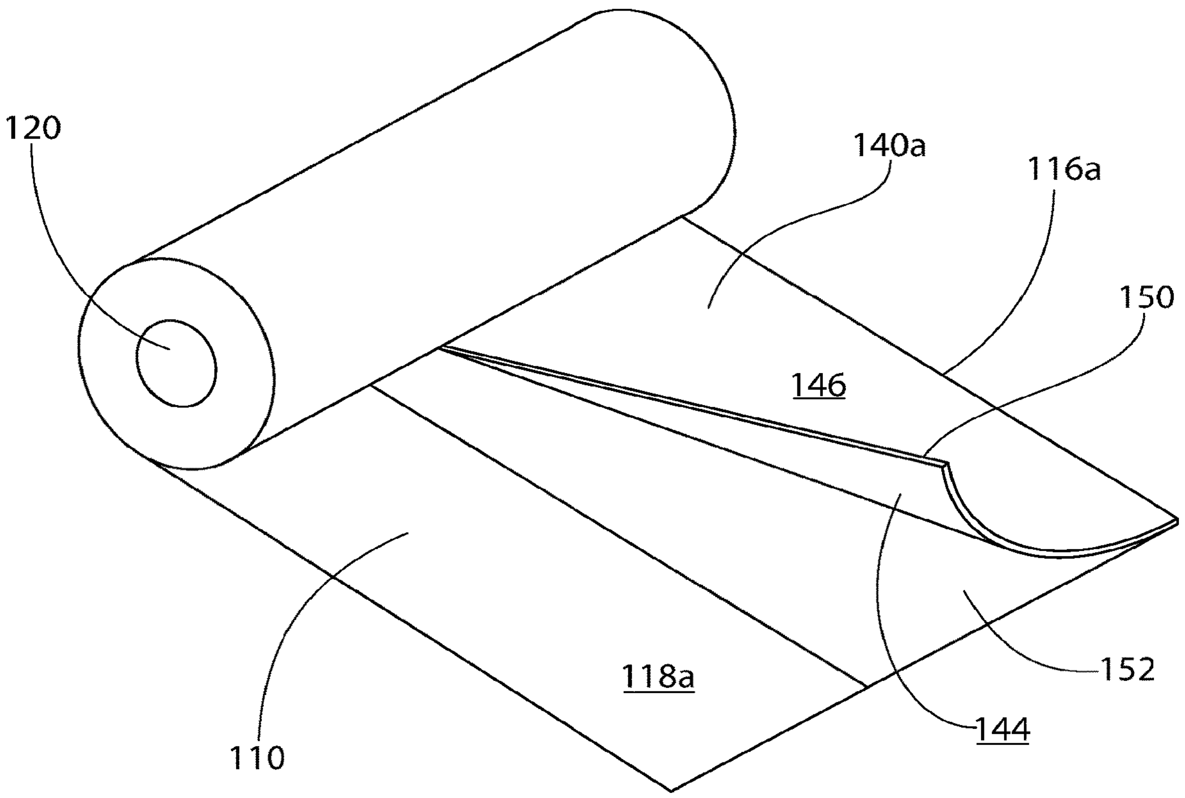
FIG. 8 is a partial perspective view showing a flexible curtain having a retention band that is partially wound around a shaft in accordance with an embodiment of the present invention.

FIG. 8 is a partial perspective view showing flexible curtain 110 having first retention band 140*a* that is partially wound around shaft 120 in accordance with one embodiment of the present invention. As flexible curtain 110 is being coiled around shaft 120 (e.g., when flexible curtain 110 moves from the deployed position to the retracted position), first retention band 140*a* is configured to be positioned against (e.g., pressed toward) the cylindrical face of shaft 120 and transition from a expanded (e.g., curved) configuration to a flattened configuration. Preferably the first retention band 140*a* is sufficiently thin to allow for tight and smooth coiling around shaft 120. In some embodiments, for example, first retention band 140*a* may be made from steel and have a thickness ranging from about 0.005 inches to about 0.01 inches. Other thicknesses may be selected for other materials. As flexible curtain 110 is being uncoiled from shaft 120 (e.g., when flexible curtain 110 moves from the retracted position to the deployed position), first retention band 140*a* is configured to transition from a flattened configuration to the expanded (e.g., curved) configuration. Second retention band 140*b* may be similarly configured on second side edge 116*b*. In one embodiment, a ratio of a retention band thickness to a retention band width is about 1:10. In one embodiment, a ratio of a retention band thickness to a retention band width is about 1:1, about 1:2, about 1:3, about 1:4, about 1:5, about 1:7, about 1:9, about 1:15, about 1:20, about 1:25, about 1:40, or about 1:50. In one embodiment, a ratio of a retention band thickness to a retention band width is at least 1:1, at least 1:2, at least 1:3, at least 1:4, at least 1:5, at least 1:7, at least 1:9, at least 1:15, at least 1:20, at least 1:25, at least 1:40, or at least 1:50. In one embodiment, a ratio of a retention band thickness to a retention band width is about 1:1 to about 1:5, about 1:5 to about 1:10, about 1:10 to about 1:15, about 1:15 to about 1:20, about 1:20 to about 1:30, about 1:30 to about 1:40, about 1:40 to about 1:50, about 1:50 to about 1:100, or about 1:100 to about 1:1,000.

Figure 9:
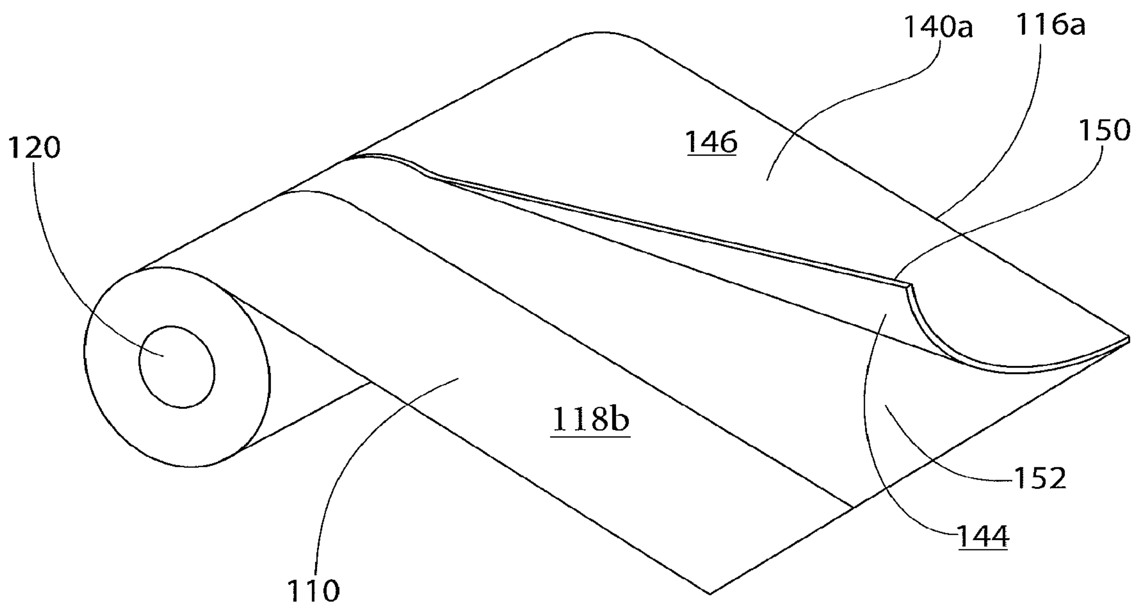
FIG. 9 is a partial perspective view showing a flexible curtain having a retention band that is partially wound around a shaft in accordance with a further embodiment of the present invention.

While FIGS. 3-8 have shown first and second retention bands 140*a*, 140*b* positioned on front surface 118*a* of flexible curtain 110, other embodiments may have first and second retention bands 140*a*, 140*b* positioned on back surface 118*b*. According to these embodiments, first and second retention bands 140*a*, 140*b* would flex toward or away from back surface 118*b* during coiling/uncoiling. Moreover, in some such embodiments, outer surface 146 of first and second retention bands 140*a*, 140*b* would generally face towards the wall (e.g., wall 10 of FIG. 2) having opening 20. Such an arrangement may be desirable according to some embodiments depending on the available space for mounting roll-up door assembly 100. FIG. 9 is a partial perspective view showing flexible curtain 110 partially wound around shaft 120 according to one such alternative embodiment. In this embodiment, flexible curtain 110 and first retention band 140*a* can be wound onto shaft 120 in the opposing direction. Unlike FIG. 8 which shows first retention band 140*a* mounted on front surface 118*a* of flexible curtain 110, in the embodiment shown in FIG. 9 first retention band 140*a* is mounted on back surface 118*b* of flexible curtain 110. In this arrangement, first retention band 140*a* may be configured such that it is stretched around shaft 120 during coiling of flexible curtain 110 rather than being pressed toward the cylindrical face of shaft 120. In other words, outer surface 146 of first retention band 140*a* faces away from shaft 120 as flexible curtain 110 is coiled around shaft 120. As flexible curtain 110 is coiled around shaft 120, first retention band 140*a* is configured to transition from a expanded (e.g., curved) configuration to a flattened configuration. As flexible curtain 110 is being uncoiled from shaft 120, first retention band 140*a* is configured to spring back from a flattened configuration to the expanded (e.g., curved) configuration.

Figure 10:
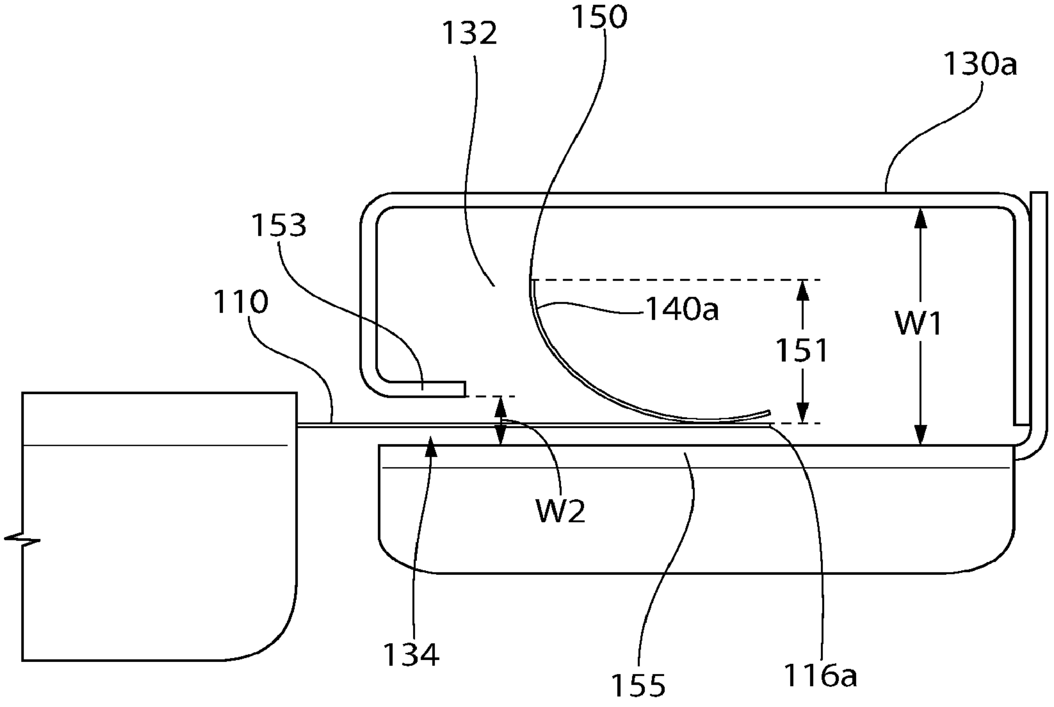
FIG. 10 is a cross-sectional view showing a retention band inserted into a guide in accordance with an embodiment of the present invention.

With reference now to FIG. 10, first retention band 140*a* in certain preferred embodiments is configured to secure flexible curtain 110 to first guide 130*a*. In some embodiments, first guide 130*a* defines a track 132 configured and dimensioned to receive at least a portion of first side edge 116*a* of flexible curtain 110. In some embodiments, track 132 is further configured and dimensioned to receive at least a portion of first retention band 140*a*. In some embodiments, track 132 has a width W1 that is sufficient to accommodate first retention band 140*a* in its expanded (e.g., curved) configuration. In some embodiments, width W1 is larger than the distance 151 between free edge 150 and flexible curtain 110 when first retention band 140*a* is in its expanded (e.g., curved) configuration. First guide 130*a*, according to some embodiments, further includes a throat 134 through which first side edge 116*a* and first retention band 140 may be received. In some embodiments, throat 134 has a throat wall 153 and an opening width W2 between a guide wall 155 and the throat wall 153 that is less than W1 and less than a distance between free edge 150 and flexible curtain 110 when first retention band 140*a* is in the expanded (e.g., curved) configuration as illustrated. In order to insert first side edge 116*a* into first guide 130*a* according to certain embodiments, first retention band 140*a* is bent or deflected towards flexible curtain 110 such that first retention band 140*a* transitions from the expanded (e.g., curved) configuration toward the flattened configuration (as illustrated in FIGS. 7*b* and 7C). This allows first retention band 140*a* to assume a thinner profile to allow insertion through narrow throat 134. Once first side edge 116*a* and first retention band 140*a* is received into track 132, first retention band 140 is allowed to spring back to its expanded (e.g., curved) configuration. Since the distance 151 between free edge 150 and flexible curtain 110 increases above width W2 of throat 134 when first retention band 140*a* moves (e.g., bends) back to its expanded (e.g., curved) configuration, first retention band 140*a* cannot be pulled out of first guide 130*a* through throat 134. Accordingly, in some embodiments, first retention band 140*a* is capable of anchoring first side edge 116*a* within track 132 since first retention band 140*a* prevents it from being pulled out of track 132 through throat 134. For example, the first retention band 140*a* is configured to contact the throat wall 153 to prevent the retention band from disengaging from first guide 130*a*. In some embodiments, the distance between free edge 150 and flexible curtain 110 in the expanded (e.g., curved) configuration is at least 1.5 times width W2, at least 2 times width W2, or at least 3 times width W2. In some embodiments, width W2 may be selected to be as small as possible while still allowing flexible curtain 110 to move freely through first guide 130*a* with minimal friction. In further embodiments, width W1 may be selected to be sufficiently sized to provide clearance for first retention band 140*a* in the expanded (e.g., curved) configuration to minimize frictional contact between first retention band 140*a* and the walls of first guide 130*a*. In some embodiments, first side edge 116*a* of curtain flexible curtain 110 is positioned within track 132 such that first retention band 140*a* is positioned as close to throat 134 as possible without resulting in excessive rubbing/friction during operation between first guide 130*a* and first retention band 140*a*. Keeping first retention band 140*a* close to throat 134, in some embodiments, may minimize the amount of billowing or sagging in flexible curtain 110 when pressure is applied against flexible curtain 110. While the above discussion has focused on first retention band 140*a* and first guide 130*a* for ease of explanation, it should be understood that second retention band 140*b* and second guide 130*b* can be similarly configured.

Figure 11:
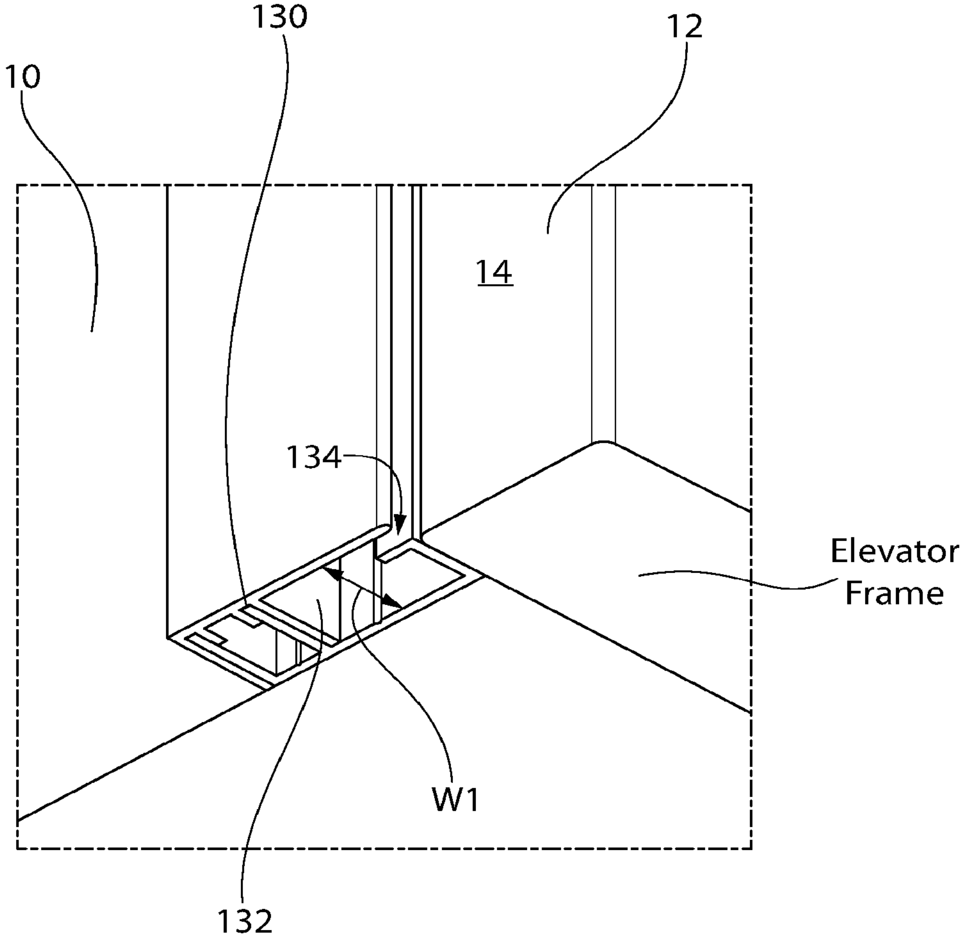
FIG. 11 is a partial top perspective, cross-sectional view showing the position of a guide relative to a frame in accordance with an embodiment of the present invention.

FIG. 11 is a top perspective sectional view showing the position of a guide 130 along wall 10 relative to a frame 12 according to one example embodiment. Frame 12 attaches to and/or protrudes from wall 10 and may be, for example, a frame which surrounds a doorway or an elevator door. In some embodiments, frame 12 protrudes about 0.75 inches from wall 10. As shown in this embodiment, guide 130 is mounted onto wall 10 immediately adjacent to frame 12. In order to allow for the flexible curtain (not shown) to clear frame 12 during use while minimizing the footprint of guide 130, guide 130 is preferably configured such that throat 134 just clears surface 14 of frame 12. Therefore, in the embodiment shown, guide 130 protrudes from wall 10 a distance generally equal to distance at which frame 12 protrudes from the wall plus the width of throat 134 and the thickness of the material used to form guide 130. Width W1 of track 132 defined by guide 130 may be generally equal to or slightly less than the distance at which frame 12 protrudes from wall 10 plus the width of throat 134. In order to use guide 130 in the arrangement shown in FIG. 11, the retention band of the flexible curtain should be configured such that it faces toward wall 10 in the deployed position within track 132. Accordingly, the configuration shown in FIG. 9 where first retention band 140*a* is positioned on back surface 118*b* of flexible curtain 110 may be particularly suited for use in this embodiment.

Figure 15:
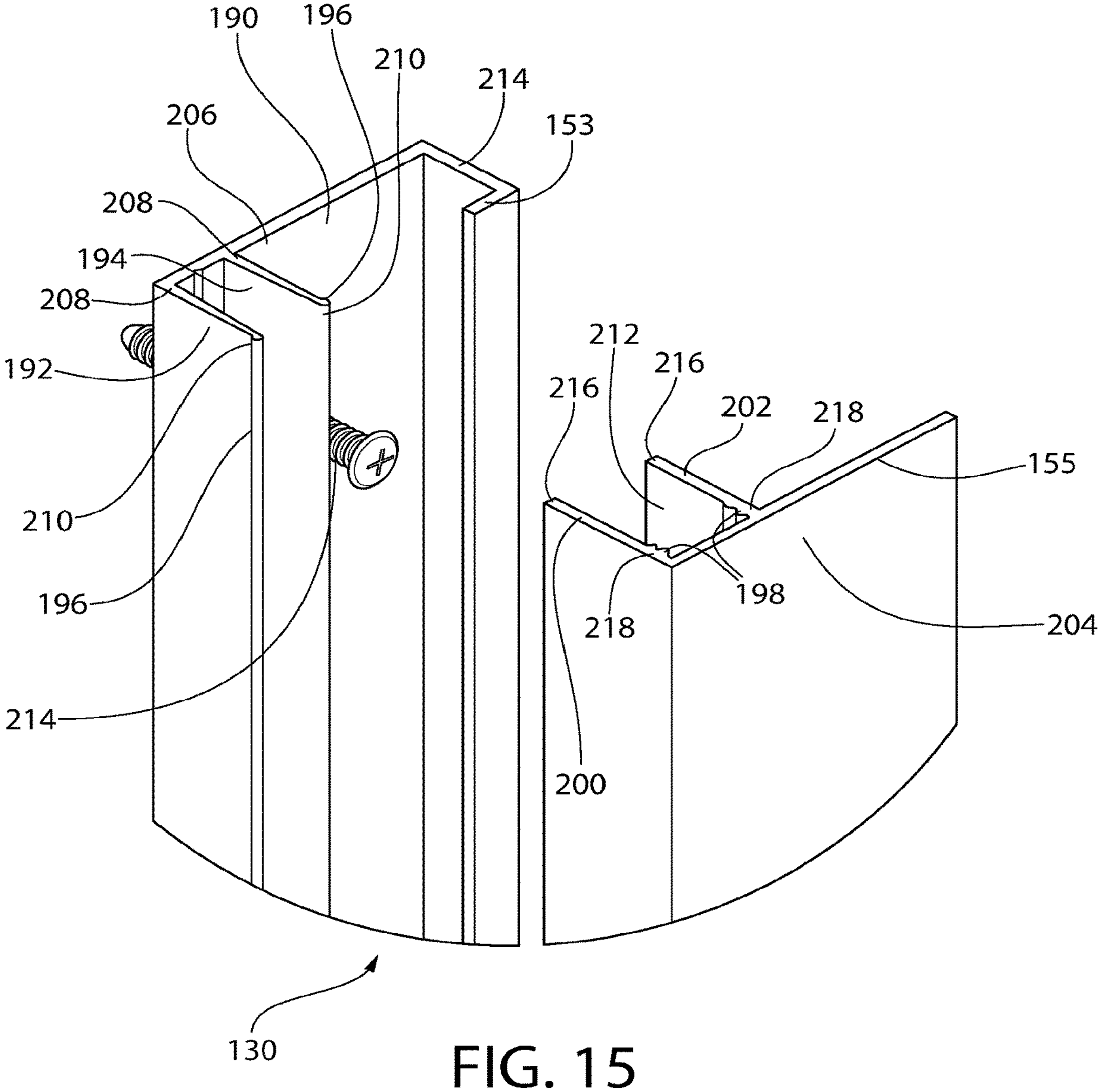
FIG. 15 in an exploded, top perspective view of the guide of FIG. 10.
Figure 16:
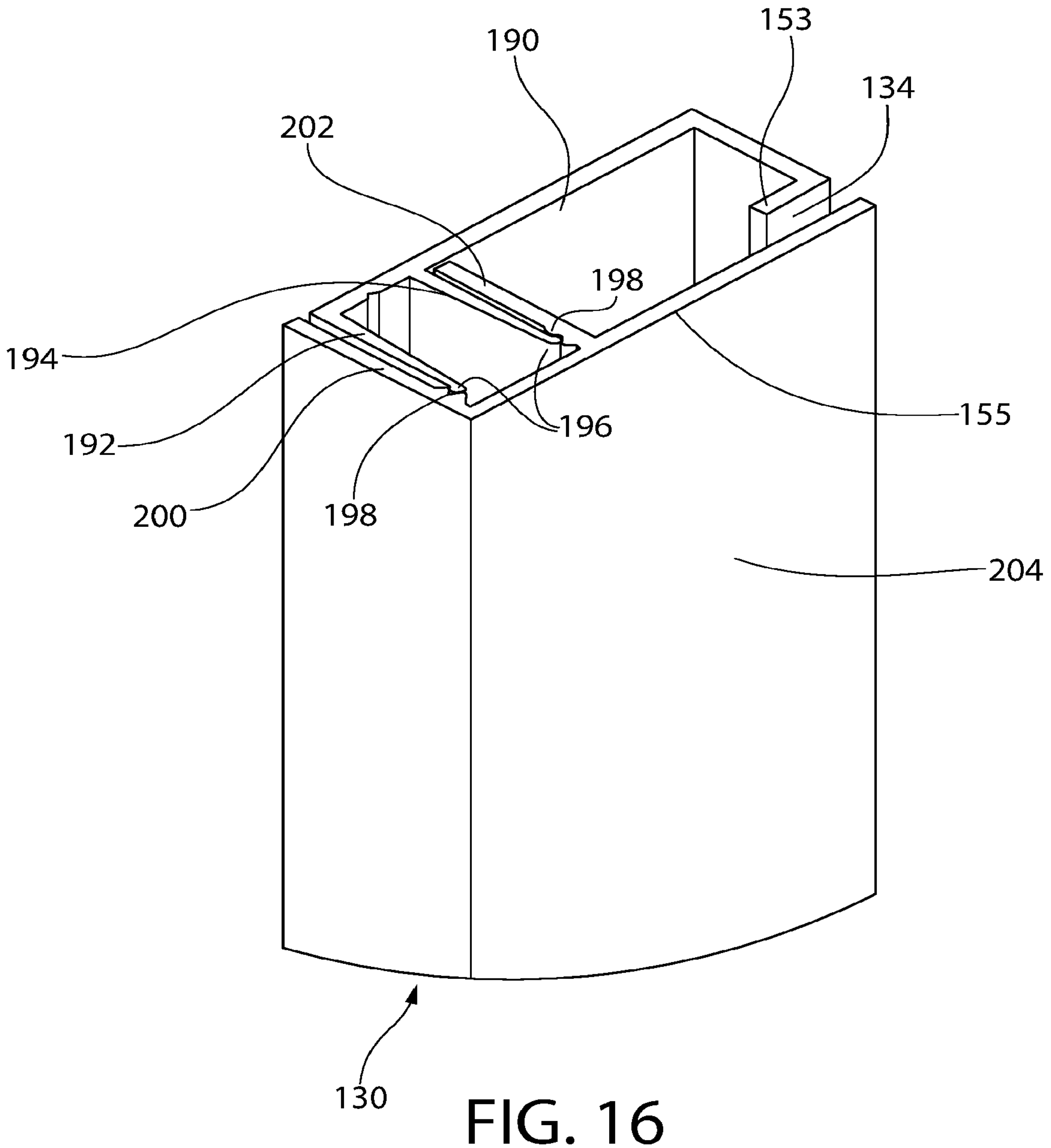
FIG. 16 is an assembled, top perspective view of the guide of FIG. 15.

In one embodiment, the guide 130 is configured to be mounted adjacent an opening and the guide 130 is configured to receive a closure (e.g., a flexible curtain) that obscures the opening. In the embodiment of FIGS. 15-16, the guide 130 includes first element 190 and second element 204 configured to be coupled together. In one embodiment, first element 190 and second element 204 can be installed in stages, thus creating a secure attachment of the guide to a structure. In one embodiment, first element 190 is configured to be secured to a structure and the second element 204 is configured to be coupled to the first element such that the assembled guide 130 is coupled to the wall and configured to receive the flexible curtain and retention band. For example, the first element 190 and second element may include securements that include press fit securements having retaining features. One embodiment may include a first prong 192 and a second prong 194 each having a retaining feature 196 (e.g., a lip, shoulder) configured to mate (e.g., snap fit, inserted into) with a notch 198 in first and second channel walls 200, 202. In one embodiment, the features shown may be reverse such that retention features of the first element 190 and second element 204 are reversed. In one embodiment, the throat 134 is defined by the space between the first element and the second element, as explained below. In one embodiment, the guide 130 is configured to movably receive the closure (e.g., the closure may slide, translate, rotate with respect to the guide while engaged with the guide).

In one embodiment, the first element 190 includes a first wall 206 configured to be secured to a structure (e.g., a wall, fascia, adjacent an elevator frame). For example, the first wall 206 may be coupled to the structure by an anchor 214 (e.g., a threaded fastener, a nail, heat stake, weld) such that the first element is fixed to the structure. In one embodiment, a proximal end 208 of each of the first prong 192 and second prong 194 are coupled to the first wall 206 (e.g., via adhesive, welding). In one embodiment, the first prong 192 and second prong 194 are configured to be at least partially compressed toward each other when the prongs are within the channel 212 to enhance the engagement of the retaining feature 196 and the notch 198. For example, a distance between the distal ends 210 of the first prong 192 and second prong 194 when the may be reduced when the prongs 192, 194 are within the channel 212 compared to when the prongs are not in the channel. In one embodiment, the distance between the proximal ends 208 of the prongs 192, 194 is equal to the distance between the distal ends 210 of the prongs 192, 194 when the first element 190 is engaged with the second element 204. In one embodiment, the distance between the proximal ends 208 of the prongs 192, 194 is equal to the distance between the distal ends 210 of the prongs 192, 194 when the first element 190 is engaged with the second element 204. In one embodiment, the distal end 210 of at least one of the first element 190 and the second element 204 includes the retaining feature 196.

In one embodiment, the second element 204 includes the channel 212 which is defined by the first channel wall 200 and second channel wall 202. In one embodiment, the channel 212 is configured to receive the first prong 192 and second prong 194 to secure the second element 204 to the first element 190. For example, a proximal end 218 of each of the first channel wall 200 and the second channel wall 202 may include the notch 198 such that the retaining feature 196 of the first prong 192 and second prong 194 are within the notch 198 when the prongs 192, 194 are within the channel 212 thereby preventing disengagement of the second element 204 from the first element 190. In one embodiment, the distance between the proximal ends 218 of the channel walls 200, 202 is less than the distance between the distal ends 210 of the first and second prongs 192, 194 in the relaxed configuration such that the prongs 192, 104 are slightly compressed when the prongs are in the channel 212 thus creating a biasing force that enhances (e.g., by forcing the retaining feature 196 further into the notch 198) the engagement of the retaining feature 196 and the notch 198 (FIG. 16). In one embodiment, the first channel wall 200 and second channel wall 202 include a plurality of notches 198 between the proximal and distal ends 216, 218 of the channel walls 200, 202 such that the width W1 of the space between the first wall 196 and the guide wall 155 may be selected based on the thickness of the flexible curtain 110. For example, the retaining feature 196 may be selectively engaged with a notch 198 corresponding to a desired width W1.

In one embodiment, a closure system is configured to partially or completely seal an opening and includes a closure means (e.g., flexible curtain 110) for obscuring (completely or partially) the opening. In one embodiment, the closure system includes a receiving means (e.g., guide 130) for receiving a free end of the closure means. In one embodiment, the closure system includes a retaining means (e.g. retention band 140) for coupling the closure means to the receiving means. In one embodiment, the closure system includes a spring means (e.g., retention band 140) for coupling the closure means to the receiving means and the spring means is configured to move from a flattened configuration to an extended configuration. In one embodiment, the closure system includes a strengthening means (e.g., reinforcement band 152) for enhancing the engagement of the retaining means to the closure means.

Figure 12:
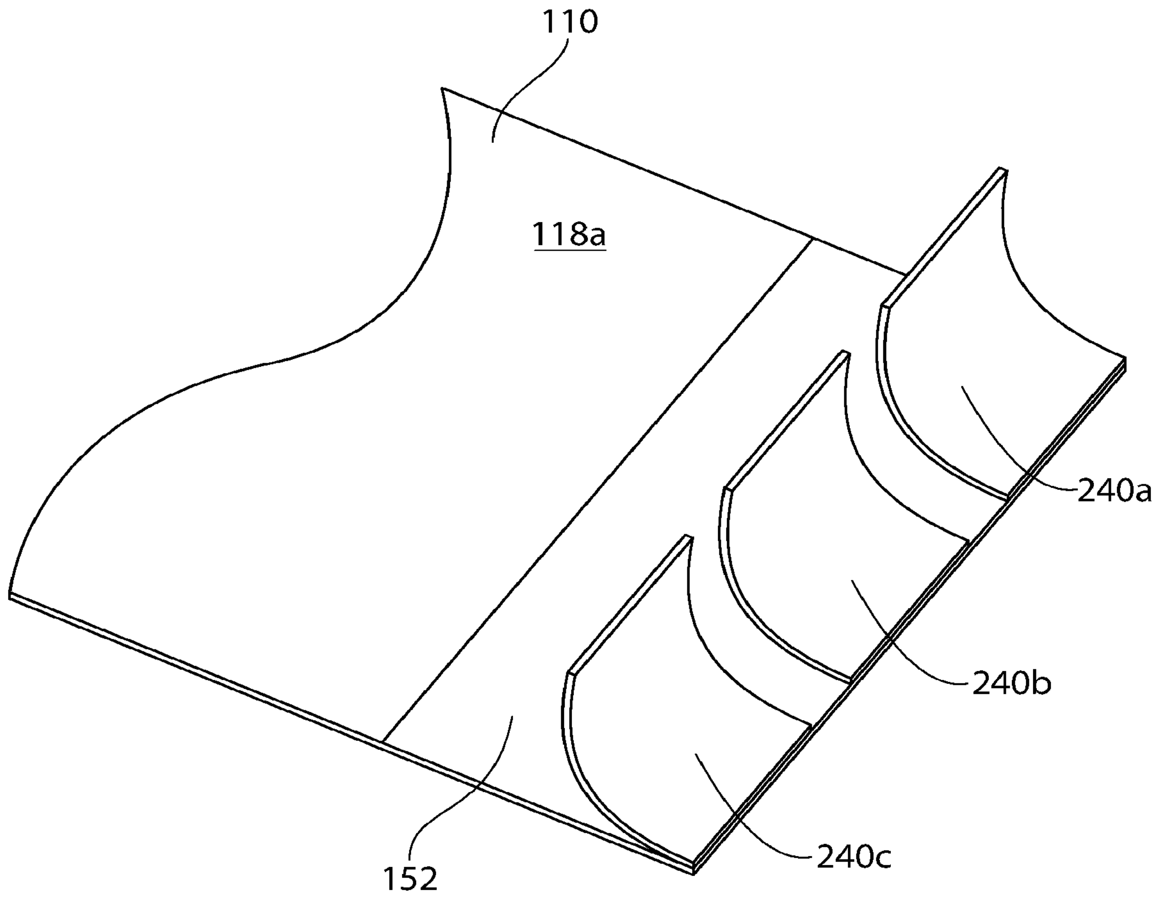
FIG. 12 is a partial perspective view showing a flexible curtain having a segmented retention band in accordance with an embodiment of the present invention.

In some embodiments, first and second retention bands 140*a*, 140*b* are each configured to be a single continuous component. In other embodiments, a retention band may include a plurality of segments. For example, as illustrated in the embodiment of FIG. 12, a retention band according to one embodiment includes a plurality of segments 240*a*-240*c* with adjacent segments being separated by a gap. The total number of segments included on the retention band will depend on the overall length of the retention band. In some embodiments, each segment 240*a*-240*c* may be from about 5 inches to about 6 inches in length, for example, which may be wrapped on a shaft with a diameter of about 4.5 inches. Other dimensions for the segments can be selected depending on other shaft diameters or materials used. In further embodiments, the gaps between adjacent segments may be minimized in order to provide the maximum amount of retention and sealing benefits when flexible curtain 110 is in the deployed position. Each of the plurality of segments may independently deflect and, according to some embodiments, having a plurality of segments 240*a*-240*c* rather than a single continuous retention band may improve coiling of flexible curtain 110, especially when thicker materials are utilized. In some embodiments, having a segmented retention band allows each segment to shift slightly which may help accommodate for the slightly different diameters caused by the variations in thickness during coiling and uncoiling. In some embodiments, having a segmented retention band may increase the flexibility of the side edge and allow for better coiling.

Figure 13A:
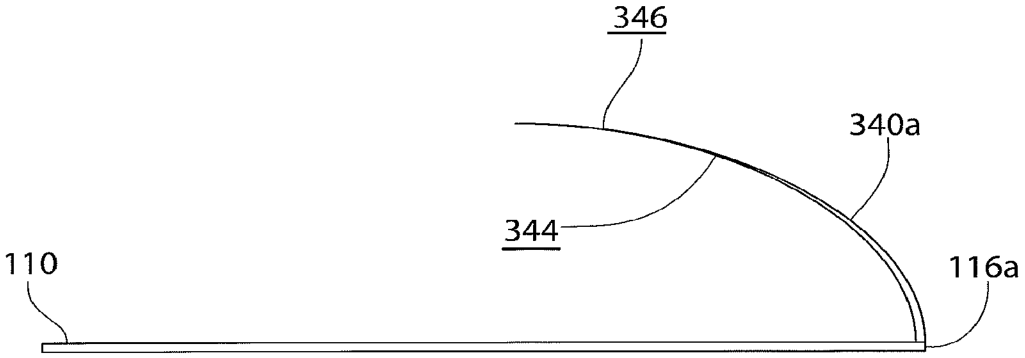
FIGS. 13A and 13B are cross-sectional views showing profiles of alternative retention bands in accordance with embodiments of the present invention.
Figure 13B:
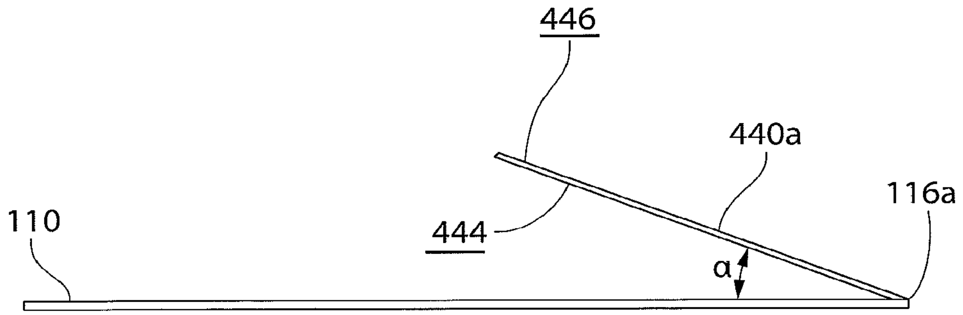

While first retention band 140*a* shown in FIGS. 5-10 may have an outer surface 146 with a concavely curved contour and an inner surface 144 having a convexly curved contour, other shapes may be used according to additional embodiments of the present invention. FIGS. 13A and 13B show example alternative profile shapes that may be utilized for a retention band. FIG. 13A, for example, shows a retention band 340*a* having a convexly curved outer surface 346 and a concavely curved inner surface 344 in the deployed position. In a further example, shown in FIG. 13B, retention band 440*a* may have substantially planar inner and outer surfaces 444 and 446. In this embodiment, retention band 440*a* may be angled with respect to flexible curtain 110 at an acute angle $\alpha$ in the deployed position (e.g., about 30 degrees to about 60 degrees, or about 40 degrees to about 50 degrees). Apart from the profile shapes, other features and properties of retention bands 340*a* and 440*a* may be the same as those described for retention bands 140*a*, 140*b*.

Figure 14A:
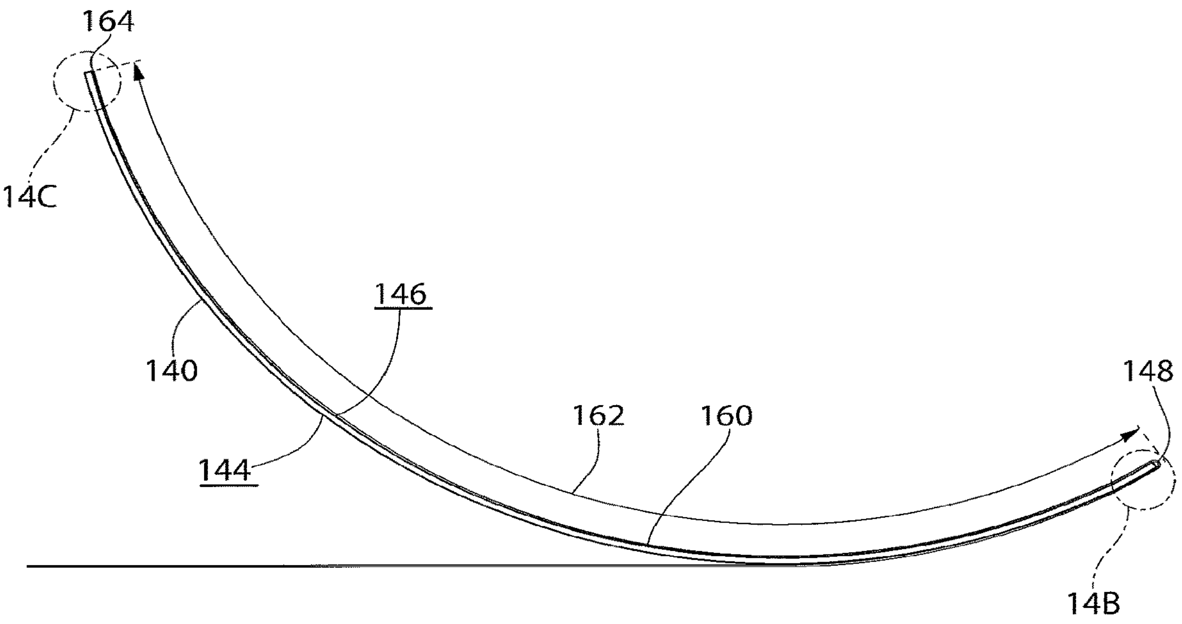
FIG. 14A, is a cross-sectional view showing a profile of an alternative attachment of the flexible curtain to the retention band in accordance with one embodiment of the present invention.
Figure 14B:
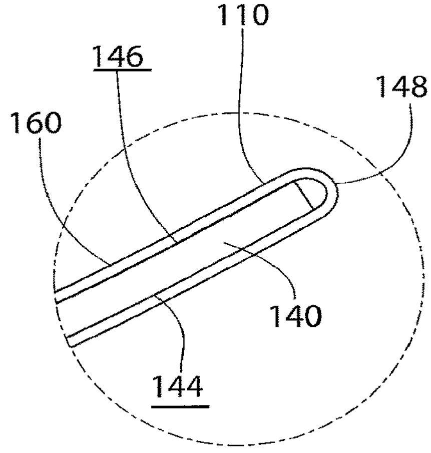
FIG. 14B is a close up cross-sectional view of the flexible curtain and retention band of FIG. 14A.
Figure 14C:
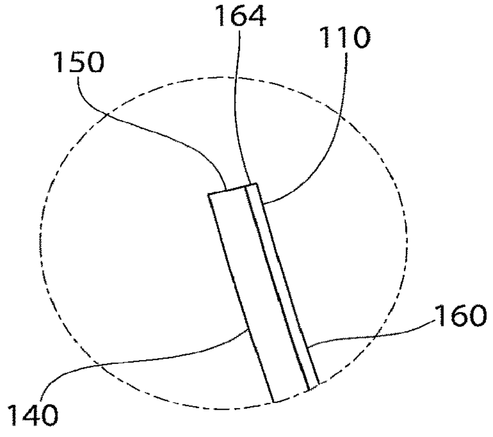
FIG. 14C is a close up cross-sectional view of the flexible curtain and retention band of FIG. 14A.

In the embodiment shown in FIG. 14A-14C, the flexible curtain 110 is configured to be wrapped around the retention band 140 to increase the strength of the attachment of the curtain to the retention band. For example, the flexible curtain 110 may be wrapped from the outer surface 146 of the retention band 140, around the fixed edge 148, and onto the inner surface 144 of the retention band 140 and affixed thereto such that as a force is applied to the flexible curtain 110, the force is distributed to the bond between the flexible curtain and the retention band over a greater surface area compared to previously described embodiments. In some embodiments, the flexible curtain 110 is affixed to the retention band by adhesive, welding, fasteners, etc. In one embodiment, the portion 160 of the flexible curtain 110 wrapped onto the outer surface 146 has a length 162 of about ¾" to about 1". In some embodiments, the selected length 162 may be influenced by one or more physical properties of the flexible curtain (e.g., material composition, thickness, heat resistance) or the geometry of the opening (e.g., length, height). In one embodiment, a ratio of the length 162 between the first edge 116 and an end 164 of the portion 160 to a length between the first side edge 116*a* and second side edge 116*b* of the flexible curtain 110 is about 1:75. In one embodiment, the end 164 of the flexible curtain 110 is configured to be aligned with the free end 150 of the first retention band 140*a*. For example, an end 164 of the portion 160 of the flexible curtain 110 and the free end 150 may be aligned such that the end 164 and free end 150 are co-planar when the flexible curtain 110 is secured to the retention band 140. In one embodiment, the free end 150 and end 164 are offset from each other. In one embodiment (not shown), the flexible curtain 110 is configured to wrap around the retention band 140 from the inner surface 144 of the flexible band 140, over the free end 150 onto the outer surface 146, and over the fixed edge 148 onto the inner surface 144.

Figure 19:
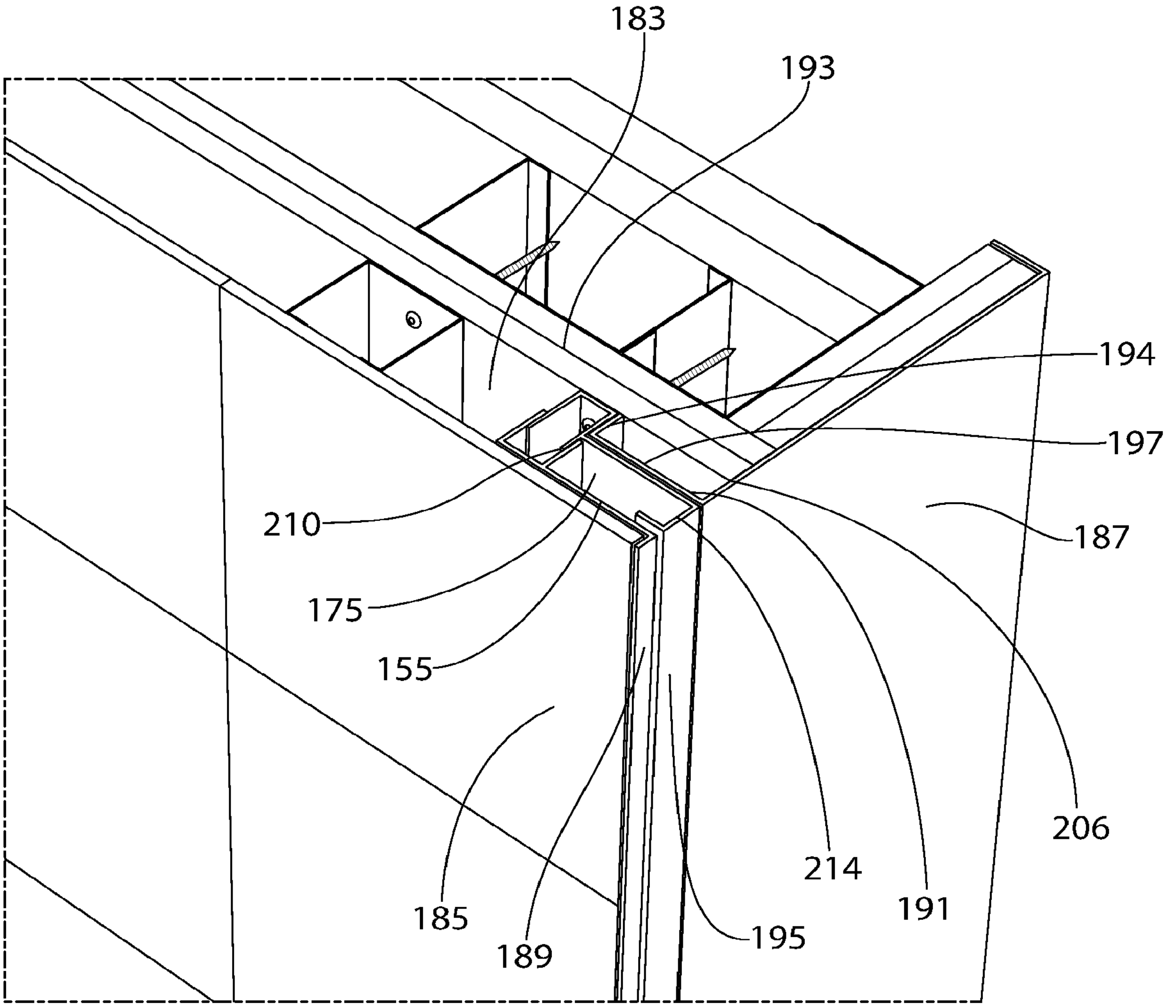
FIG. 19 is a top perspective, sectional view of a guide in accordance with one embodiment of the present invention.
Figure 20:
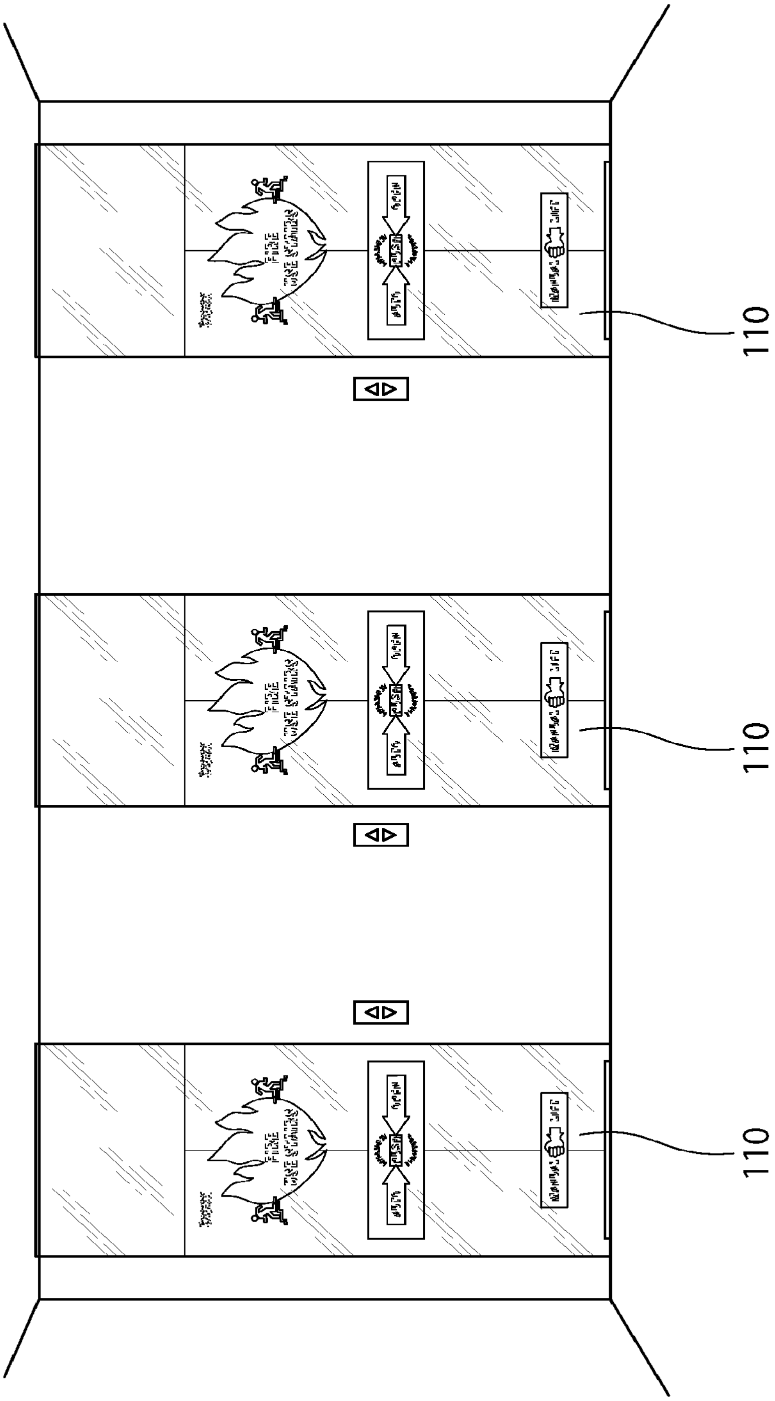
FIG. 20 is an environmental view showing the flexible curtain of FIG. 17 in an extended position.

In one embodiment, a guide assembly 175 is mounted adjacent to an elevator frame and may be mounted to the face of a wall, exposed, or hidden (e.g., under sheetrock, wood or masonry fascia). For example, as shown in FIG. 19, the guide assembly 175 may be mounted in a recess 183 between fascia 185 and a wall 193. Guide assembly 175 is similar to guide 130 but guide assembly 175 includes a return 189 and the first wall 206 is coupled to the second prong 194 between the proximal and distal end of the prong. In one embodiment, the first wall 206 may prevent over insertion of the first and second prongs into the channel because the channel walls contact the first wall 206 impeding further movement of the prongs into the channel. In one embodiment, the return 189 is configured to be adjacent a sidewall of the fascia 185. For example, the return 189 may extend away from guide wall 155 such that the return 189 is adjacent the sidewall of the fascia 185 when the guide wall is positioned adjacent a rear surface of the fascia and the guide is within the recess 183. In one embodiment, the elevator jamb 187 is configured to at least partially retain the guide assembly 175 within the recess 183. For example, the elevator jamb 187 may include a bump 197 adjacent the second prong 194 that prevents guide assembly 175 from being pulled out of recess 183. In one embodiment, the return 189, a face 195 of the spacer wall 214, and the elevator jamb 187 are co-planar or nearly co-planar for an aesthetically pleasing installation. As shown in FIG. 20, in one embodiment, the guide (not shown in FIG. 20) may be behind the fascia 185 adjacent an elevator and extend from the floor to the ceiling. In one embodiment, a portion 183 of the fascia 185 above the elevator doors may be recessed compared to the other sections of the fascia such that the flexible curtain 110 is in a plane in front of the recessed portion 183 and behind the fascia 185. In one embodiment, a guide includes a fascia engaging component (e.g., return 189), a channel having an opening (e.g., throat 134) configured to receive a door edge (e.g., retention band 140), and a retention surface (e.g., throat wall 153) adjacent the channel configured to abut a free end of a retention component coupled to the door edge.

In some embodiments, a pull out strength may be observed when the flexible curtain 110 and retention band 140 are connected to the guide 130 as previously described and a force is applied to the flexible curtain to pull the flexible curtain until it is disengaged from either the guide or the retention band. In one embodiment, the flexible curtain 110 (e.g., a plastic flexible curtain) has a pull out strength of about 6.0-6.55 pounds per linear inch of retention band at a temperature of about 65° F. to about 70° F. In one embodiment, the flexible curtain 110 (e.g., a plastic flexible curtain) has a pull out strength of about 1.5-2.0 pounds per linear inch of retention band at a temperature of about 400° F. In one embodiment, the flexible curtain 110 (e.g., a plastic flexible curtain) coupled to the retention band has a pull out strength of about 11.0-11.5 pounds per linear inch of retention band at a temperature of about 60° F. to about 70° F. In one embodiment, the flexible curtain 110 (e.g., a plastic flexible curtain) coupled to the retention band has a pull out strength of about 1.5-2.0 pounds per inch at a temperature of about 400° F. In one embodiment, the flexible curtain 110 (e.g., a woven fiberglass flexible curtain) coupled to the retention band has a pull out strength of about 1.0-1.5 pounds per linear inch of retention band at a temperature of about 1800° F. In one embodiment, the flexible curtain 110 is coupled to the retention band and has a pull out strength of at least 1.1, 1.2, 1.3, 1.4, 1.5, 2.0, 2.5, 3.0, 3.5, 4.0, 4.5, 5.0, 6.0, 7.0, 8.0, 9.0, 10.0, 15.0, 20.0, 25.0, 30.0, 40.0, or 50.0 pound per inch at a temperature of about 400° F. In some embodiments, the flexible curtain 110 is configured to comply with UL (Underwriter's Laboratories) 1784 conditions.

Figure 17:
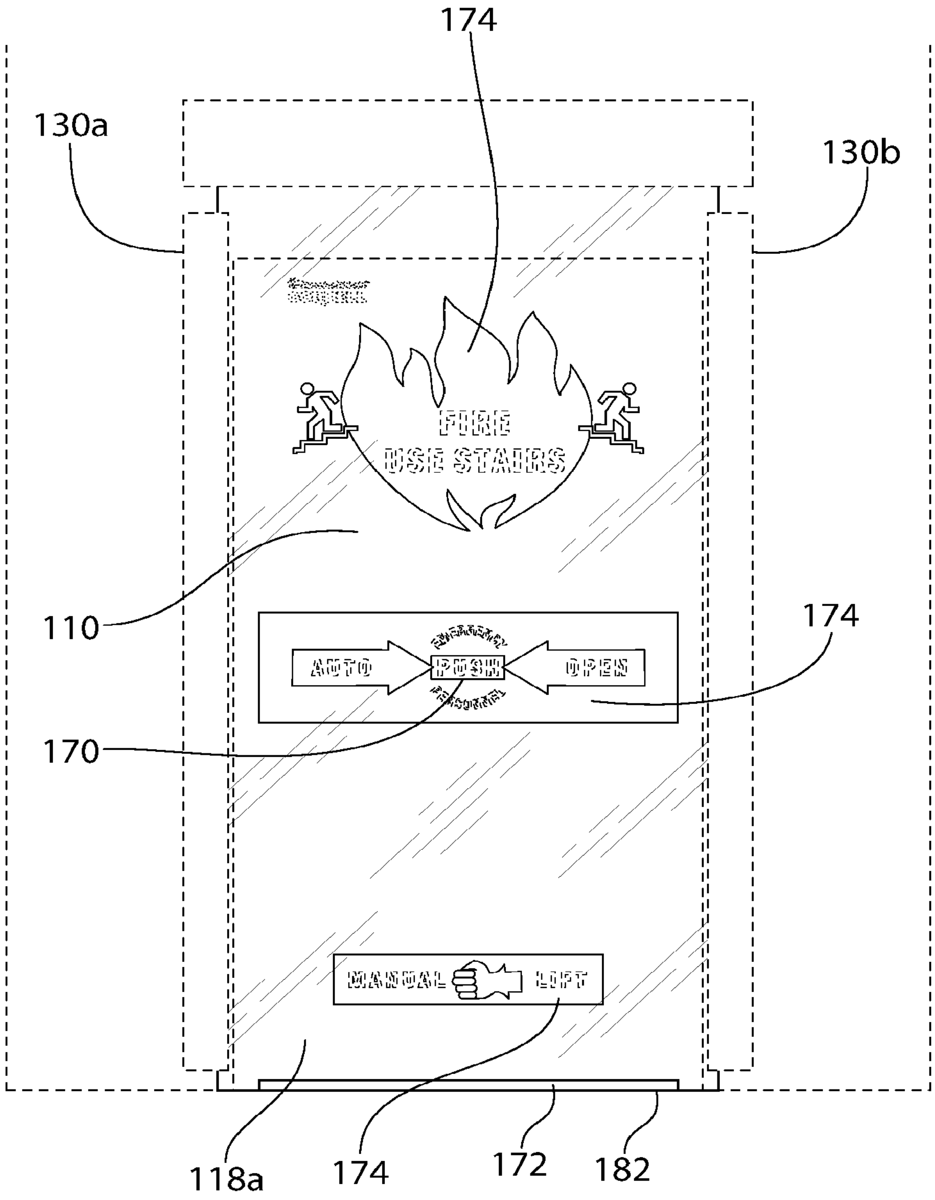
FIG. 17 is a front view of the flexible curtain of FIG. 1 with decals.
Figure 18:
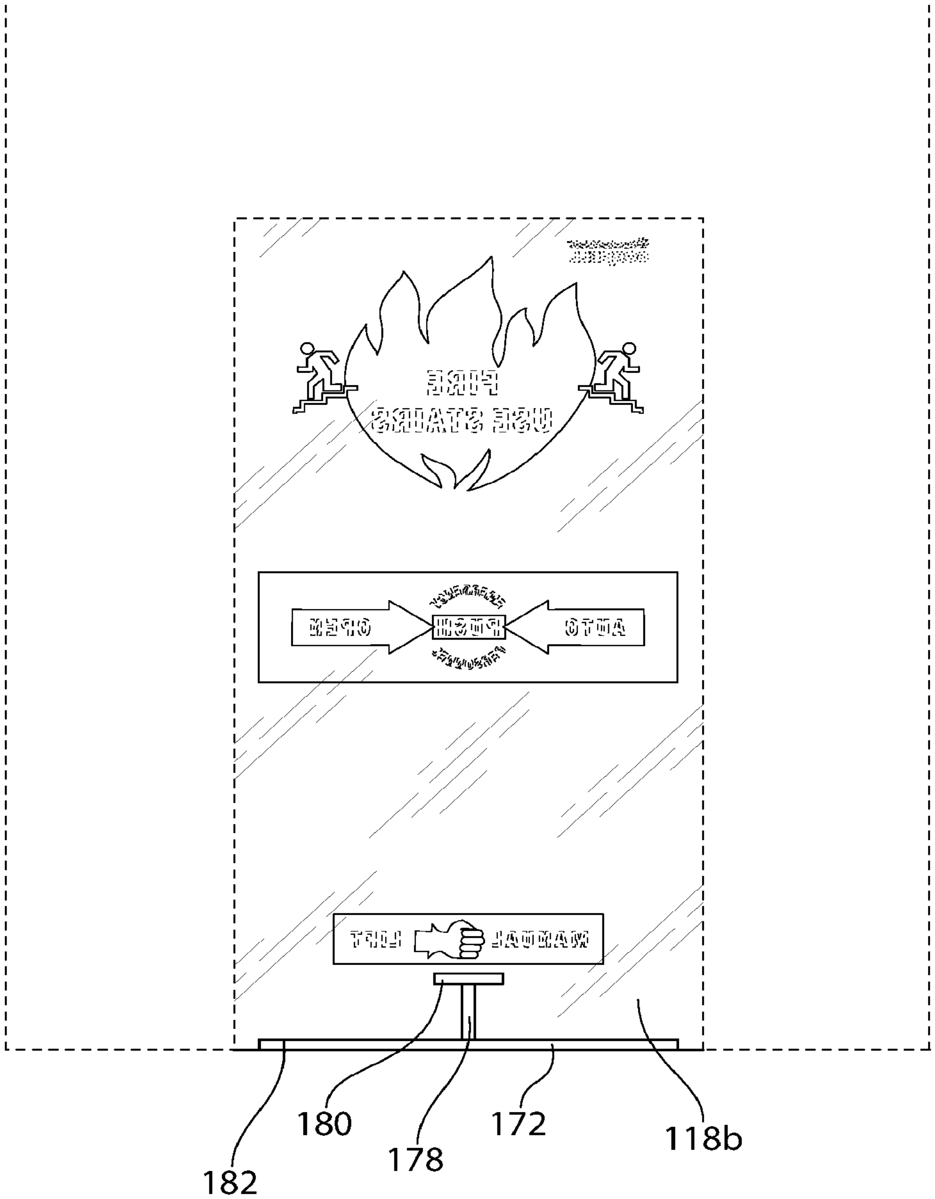
FIG. 18 is a rear view of the flexible curtain of FIG. 17.

In the embodiment shown in FIGS. 17-18, the flexible curtain 110 is configured to be opened either automatically (e.g., by an actuator in response to a signal, such as a smoke detector, a fire detector initiated signal or an all-clear signal) or manually by a user. For example, the flexible curtain may include an activator (e.g., a pushbutton, switch, toggle, voice command receiver, potentiometer) configured to be engaged by a user. The activator may be configured to send a signal (e.g., electronic signal) to an actuator (e.g., motor, piston) which is configured to move the flexible curtain to the retracted position. In one embodiment, the activator 170 includes a pushbutton configured to send a signal to a motor (not shown). In one embodiment, the activator 170 is configured to be in electrical communication (e.g., wired, wireless communication) with the motor such that the activator can send a signal to the motor. In one embodiment, the motor is configured to rotate the shaft, thereby moving the flexible curtain 110 to the retracted position. For example, the activator 170 may be a pushbutton connected via wires to the motor (e.g., brushless DC motor, stepper motor, induction motor), which may be coupled to the shaft (e.g., via gears, chain) such that the motor rotates the shaft in response to a signal from the activator 170. In one embodiment, the activator 170 may be engaged by the user from both the front surface 118*a* and the back surface 118*b* of the flexible curtain 110. In one embodiment, the activator (e.g., an open switch) is a screen-mounted and engageable by user on either side or both sides of the screen. In one embodiment, the flexible curtain 110 includes an activator 170 on the front surface 118*a* and a second activator 170 on the back surface 118*b* such that the flexible curtain 110 is an uninterrupted protective barrier to heat, smoke, and/or fire.

In one embodiment, the activator 170 is embedded within the flexible curtain 110. For example, the activator 170 may be within an aperture (not shown) in the flexible curtain 110 such that the activator 170 extends from the front surface 118*a* to the back surface 118*b* of the flexible curtain. In one embodiment, the activator 170 is coupled (e.g., via adhesive, welding, heat stakes, connectors) to a surface of the flexible curtain 110. In one embodiment, the flexible curtain includes a sheet 176 configured to be positioned over the activator 170. For example, the activator 170 may be attached to the flexible curtain 110 (e.g., via adhesive, heat stake, threaded connector) and the sheet 176 may be positioned over the activator 170 and coupled to the flexible curtain 110 (e.g., via adhesive, heat seal).

In one embodiment, the flexible curtain 110 includes a bottom bar 172. Bottom bar may be configured to seal a space between the bottom of the flexible curtain and a floor (FIG. 17-18). For example, the bottom bar 172 may be a seal (e.g., brush seal, a rubber seal) configured to prevents the unwanted migration of smoke and/or fire when the flexible curtain is in the extended position by filling a gap between the bottom of the flexible curtain 110 and the floor. In one embodiment, the flexible curtain 110 includes a lift strap 178 configured to be engaged by a user to manually move the flexible curtain 110 between the extended position and the retracted position (FIG. 18). For example, the lift strap 178 may be a strap or handle coupled to the bottom bar 172 such that a user can grasp and pull the lift strap 178 to move the flexible curtain to the retracted position. In one embodiment, the lift strap 178 is coupled to the bottom bar 172 by adhesive, anchors, etc. In one embodiment, a retainer 180 is configured to at least temporarily secure a free end of the lift strap 178 to the flexible curtain 110 such that the lift strap does not snag when the lift strap is not in use. For example, the retainer 180 may be tape with adhesive backing or a mechanical hook and loop fastener (e.g., Velcro) that attaches to the flexible curtain 110. In one embodiment, the flexible curtain 110 includes a lift strap 178 on each of the front surface 118*a* and the back surface 118*b* such that a user standing on either side of the flexible curtain 110 can raise the curtain. Bottom bar 172 may be configured to retain flexible curtain 110 in guides and to seal curtain 110 at sill 182. Bottom bar 172 may be further configured to terminate upward travel at an elevator opening flush to fascia or at ceiling height and may be finished to match those surfaces, It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps, presently existing or later to be developed that perform substantially the same function or achieve substantially the same result as the corresponding embodiments described herein may be utilized according to the present invention.

What is claimed is:

1. A roll-up door guide assembly for securing a rollup door to a structure comprising:

a first guide secured to the structure, the first guide having a throat and a track, the throat having an opening width smaller than a width of the track; and a flexible curtain disposed within and in sliding engagement with the first guide from an extended position to a retracted position, the flexible curtain including:

a first side edge disposed at an edge of the flexible curtain, a first reinforcement band coupled to the first side edge, wherein the first reinforcement band comprises a metal, a first retention band welded to the first reinforcement band and mounted along the first side edge, the first retention band comprising an elastic material that returns to a curved shape after being held in a flattened configuration when the flexible curtain is coiled, the first retention band including:

a fixed edge attached to the flexible curtain along the first side edge;

a free edge opposite from the fixed edge, wherein the free edge is biased away from the flexible curtain when the first retention band is in an expanded configuration, and the free edge is urged toward the flexible curtain when the first retention band is in the flattened configuration, wherein a distance between the free edge and the flexible curtain is greater than the opening width of the throat in the expanded configuration; and a seal disposed along an end of the flexible curtain extending between the first side edge and a second side edge opposite the first side edge, the flexible curtain having a pull-out strength of about 1.1 pounds to 50.0 pounds per linear inch of first retention band at a temperature of about 400° Fahrenheit when the flexible curtain is disposed within the first guide.

2. The roll-up door guide assembly of claim 1, wherein the first retention band is configured to be inserted into the track through the throat of the first guide.

3. The roll-up door guide assembly of claim 2, wherein disposing the first retention band into the track urges the first retention band into the flattened configuration when passing through the throat and springs the first retention band into the expanded configuration when received in the track, wherein the first retention band springing into a locking configuration increases the distance between the free edge of the first retention band and the flexible curtain to greater than the opening width of the throat.

4. The roll-up door guide assembly of claim 1, wherein the flexible curtain has a pull-out strength of about 6.0 to about 11.5 pounds per linear inch of retention band at a temperature of about 65° Fahrenheit to about 70° Fahrenheit when the first retention band and the first side edge are received in the track of the first guide.

5. The roll-up door guide assembly of claim 1, wherein the seal comprises at least one of: a brush seal or a flexible seal.

6. The roll-up door guide assembly of claim 1, wherein the first retention band is configured to deflect towards the flexible curtain in response to the first side edge of the flexible curtain being inserted into the throat.

7. The roll-up door guide assembly of claim 1, wherein a portion of the first guide is configured to be received between an inner surface of the first retention band and the flexible curtain.

8. The roll-up door guide assembly of claim 1, further comprising a second guide having a track configured to receive at least a portion of the second side edge of the flexible curtain.

9. The roll-up door guide assembly of claim 8, wherein the flexible curtain further comprises a second retention band mounted along the second side edge of the flexible curtain, the second retention band including an inner surface at least partially facing towards the flexible curtain, an outer surface opposite the inner surface, a fixed edge attached to the flexible curtain along the second side edge, and a free edge opposite from the fixed edge, the free edge of the second retention band biased away from the flexible curtain when the second retention band is in an expanded configuration and the free edge of the second retention band urged toward the flexible curtain when the second retention band is in a flattened configuration, and wherein the second retention band is disposed within the track defined by the second guide and configured to anchor the second side edge of the flexible curtain within the track defined by the second guide.

10. The roll-up door guide assembly of claim 1, wherein the first guide includes a first element and a second element configured to engage the first element, wherein the throat is positioned between the first element and the second element.

11. The roll-up door guide assembly of claim 1, wherein the first guide is configured to be secured along a lateral side of an aperture.

12. The roll-up door guide assembly of claim 1, wherein the first guide is configured to be secured outside a frame that defines an aperture.

13. The roll-up door guide assembly of claim 12, wherein the first guide is configured to be secured directly adjacent to or abut the frame that defines the aperture.

14. The roll-up door guide assembly of claim 1, wherein the first guide is configured to be secured on or within a frame that defines an aperture.

15. The roll-up door guide assembly of claim 8, wherein the first guide and the second guide are configured to be mounted parallel to each other on either side of an aperture and spaced apart by a predetermined distance that is sufficient to cover the aperture.

16. The roll-up door guide assembly of claim 1, wherein the first guide is configured to be mounted perpendicular to a shaft.

17. The roll-up door guide assembly of claim 16, wherein the first guide is configured to direct the flexible curtain as the flexible curtain is coiled about the shaft from the extended position to the retracted position.

18. The roll-up door guide assembly of claim 1, wherein the first guide includes a fascia attachment element.

19. The roll-up door guide assembly of claim 1, wherein the first retention band cooperates with the first guide to occlude a passage of smoke through the first guide.

* * * * *